US010183565B2

(12) United States Patent
Krittian

(10) Patent No.: US 10,183,565 B2
(45) Date of Patent: *Jan. 22, 2019

(54) HYDROSTATIC DRIVE WITH ENERGY STORAGE

(71) Applicant: Linde Hydraulics GmbH & Co. KG, Aschaffenburg (DE)

(72) Inventor: Lukas Krittian, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 367 days.

This patent is subject to a terminal disclaimer.

(21) Appl. No.: 14/557,521

(22) Filed: Dec. 2, 2014

(65) Prior Publication Data

US 2015/0165887 A1 Jun. 18, 2015

(30) Foreign Application Priority Data

Dec. 13, 2013 (DE) ........................ 10 2013 114 040

(51) Int. Cl.
*F16H 61/4096* (2010.01)
*B60K 6/12* (2006.01)
(Continued)

(52) U.S. Cl.
CPC .................. *B60K 6/12* (2013.01); *B60K 6/48* (2013.01); *F16H 61/4096* (2013.01); *F16H 61/42* (2013.01); *B60K 2006/123* (2013.01)

(58) Field of Classification Search
CPC ................................................... F16H 61/4096
See application file for complete search history.

(56) References Cited

U.S. PATENT DOCUMENTS 4,995,470 A * 2/1991 Yamaguchi ......... F15B 11/0445 180/197
6,854,268 B2 * 2/2005 Fales ....................... F15B 1/024 60/414

(Continued)

FOREIGN PATENT DOCUMENTS

CN 101484731 A 7/2009
CN 102865261 A 1/2013

(Continued)

*Primary Examiner* — F. Daniel Lopez
(74) *Attorney, Agent, or Firm* — The Webb Law Firm

(57) ABSTRACT

A hydrostatic drive has a hydrostatic pump (3) driven by a drive motor (2) and connected in a closed circuit with a hydrostatic motor (4). The closed circuit is formed by a first hydraulic connection (6*a*) and a second hydraulic connection (6*b*). Each of the hydraulic connections (6*a*, 6*b*) can form the high-pressure side or the low-pressure side of the closed circuit. A high pressure accumulator device (20) can be connected with the respective high-pressure side hydraulic connection (6*a*, 6*b*) and, simultaneously, the respective low-pressure side hydraulic connection (6*b*, 6*a*) can be connected with a hydraulic balancing device (30). A valve device (50) is provided for this simultaneous connection. The valve device (50) is a hydraulically controlled shuttle valve device (51) connected to the two hydraulic connections (6*a*, 6*b*), the high pressure accumulator device (20) and the hydraulic balancing device (30). The shuttle valve device (30) has a high pressure accumulator path (51*a*) and a hydraulic balancing path (51*b*), and is in communication with the two hydraulic connections (6*a*, 6*b*) of the closed circuit.

19 Claims, 10 Drawing Sheets

(51) Int. Cl.
*B60K 6/48* (2007.10)
*F16H 61/42* (2010.01)

(56) References Cited

U.S. PATENT DOCUMENTS

| | | | | |
|---|---|---|---|---|
| 7,107,767 | B2 * | 9/2006 | Frazer | B60K 6/12 60/414 |
| 7,775,040 | B2 * | 8/2010 | Khalil | F15B 11/024 60/414 |
| 8,244,446 | B2 | 8/2012 | Heren et al. | |
| 9,765,798 | B2 * | 9/2017 | Krittian | F15B 1/04 |
| 9,816,534 | B2 * | 11/2017 | Krittian | F15B 1/027 |
| 2012/0240564 | A1 * | 9/2012 | Wesolowski | B60K 6/12 60/327 |
| 2012/0304631 | A1 * | 12/2012 | Nelson | F16H 61/438 60/327 |
| 2015/0204354 | A1 * | 7/2015 | Krittian | B60K 6/12 60/413 |
| 2015/0204356 | A1 * | 7/2015 | Krittian | B60K 6/12 60/414 |

FOREIGN PATENT DOCUMENTS

| | | | |
|---|---|---|---|
| DE | 102007012121 | A1 | 9/2007 |
| WO | 2012166520 | A2 | 12/2012 |

* cited by examiner 1
14a
14b
15
6a
30
50,51,55
61a
60a
52a
31
50a
54
50b
36
42
4b
12
9
53
61b
40a
40b
21
2
3
3a
4a
4
5
41
6b
20
60b
52b
40

1
50,51
60a
52a
79,72
76
75
6a
61a
80
78,71
77
54
36
12
61b
53
9
4b
2
3
3a
81
74
4
5
6b
73
20,30,70
60b
4a
52b 6a
6b
60a
61a
150
151
155
54
53
154
61b
60b
52a
52b
153
156
50, 51, 56

HYDROSTATIC DRIVE WITH ENERGY STORAGE

CROSS REFERENCE TO RELATED APPLICATIONS

This application claims priority to German Application No. DE 102013114040.8 filed Dec. 13, 2013, which is herein incorporated by reference in its entirety.

BACKGROUND OF THE INVENTION

Field of the Invention

This invention relates to a hydrostatic drive with a hydrostatic pump driven by a drive motor and connected in a closed circuit with a hydrostatic motor. The hydrostatic motor is in a drive connection with the consumer. The closed circuit is formed by a first hydraulic connection and a second hydraulic connection. Each of the hydraulic connections can form the high-pressure side or the low-pressure side of the closed circuit. A high pressure accumulator device can be connected with the respective high-pressure side hydraulic connection for the storage of energy and the discharge of energy and, simultaneously, the respective low-pressure side hydraulic connection can be connected with a hydraulic balancing device. A valve device is provided for the control of the simultaneous connection of the high pressure accumulator device with the high-pressure side hydraulic connection and the hydraulic balancing device with the low-pressure side hydraulic connection.

Description of Related Art

Hydrostatic drives in a closed circuit are used for driving a consumer in vehicles such as motor vehicles or public transit vehicles, e.g. buses, preferably for urban mass transit, and for mobile self-propelled machines, in particular industrial trucks, agricultural machines, forestry machines and construction machines, such as, for example, excavators, wheel and telescoping loaders, tractors, combine harvesters, forage harvesters, sugar beet and potato harvesters.

With the high pressure accumulator device for the storage and discharge of energy and which can be connected with the respective high-pressure side hydraulic connection of the closed circuit, a hybrid drive and, thus, a hybrid function, can be realized in a hydrostatic drive with a closed circuit. With the energy in the high pressure accumulator device, during a discharge operation of the high pressure accumulator device, the consumer can be driven in a drive phase. If the high pressure accumulator device is operated in a charging operation during a braking or deceleration phase of the consumer and is charged with hydraulic fluid, energy can be recovered during the braking or deceleration of the consumer.

In a hydrostatic drive in a closed circuit, it must be ensured that during the charging operation of the high pressure accumulator device in which a determined amount of hydraulic fluid is removed from the high pressure accumulator device out of the high pressure hydraulic connection of the closed circuit, the corresponding quantity of hydraulic fluid is made up at the low-pressure side hydraulic connection of the closed circuit. During discharge operation of the high pressure accumulator device, in which a determined quantity of hydraulic fluid is fed from the high pressure accumulator device to the high pressure side hydraulic connection of the closed circuit, it must be ensured that the corresponding quantity of hydraulic fluid is removed from the low-pressure side hydraulic connection of the closed circuit.

To make possible this balancing in terms of quantity or volume at the low-pressure side hydraulic connection of the closed circuit during the extraction or the addition of a quantity of hydraulic fluid at the high-pressure side hydraulic connection by the high pressure accumulator device, a hydraulic balancing device can be provided that balances the amount or volume at the two hydraulic connections of the closed circuit by a discharge or addition of hydraulic fluid at the low-pressure side hydraulic connection.

If, on a hydrostatic drive system with a closed circuit, each of the two hydraulic connections can form the high-pressure side or the low-pressure side and the hybrid function is to be made available regardless of which of the hydraulic connections represents the high-pressure side and the low-pressure side, a valve device for the hybrid function is necessary that makes possible the simultaneous connection of the high pressure accumulator device with the respective high-pressure side hydraulic connection and the hydraulic balancing device with the respective low-pressure side hydraulic connection.

DE 10 2007 012 121 A1 describes a generic drive system with a hybrid function in which the valve device that makes possible the simultaneous connection of the high pressure accumulator device with the respective high-pressure side hydraulic connection and the hydraulic balancing device with the respective low-pressure side hydraulic connection is formed by an electrically actuated directional control valve or by a plurality of individual valves that can be pre-set with one or more electrically actuated setting valves. On account of the requirement for the electric actuators, however, the electric actuation or electric setting of the valve device results in a high level of construction effort with high manufacturing costs. The valve device takes up a large amount of space and is prone to interference and malfunctions.

Therefore, it is an object of this invention to provide a hydrostatic drive in which the valve device for the hybrid function has a simple, compact, and economical construction as well as a robust operation.

SUMMARY OF THE INVENTION

The invention teaches that this object is accomplished in that the valve device is a hydraulically controlled shuttle valve device which is connected to both hydraulic connections, the high pressure accumulator device, and the hydraulic balancing device. The shuttle valve device has a high pressure accumulator path and a hydraulic balancer path and is in communication for actuation with both hydraulic connections of the closed circuit. The invention therefore teaches that the valve device is formed by a hydraulically controlled and, therefore, hydraulically actuated shuttle valve device which is in communication for actuation with the two hydraulic connections of the closed circuit and is controlled and actuated by the high pressure present in the corresponding high-pressure side hydraulic connection. With the shuttle valve device which is purely hydraulically controlled and actuated, it therefore becomes possible without electrical actuators to ensure that the respective high-pressure side hydraulic connection of the closed circuit is in communication via the high pressure accumulator path with the high pressure accumulator device and the respective low-pressure side hydraulic connection of the closed circuit is in connection via the hydraulic balancer path with the hydraulic balancing device. Because no electrical actuators are necessary for the actuation of the shuttle valve device of the invention, the result is a valve device with simple, compact, economic construction, and interference-insensitive operation.

In one advantageous embodiment of the invention, the shuttle valve device is constructed so that the shuttle valve device, as a function of the high pressure present in the high-pressure side hydraulic connection of the closed circuit, connects the high-pressure side hydraulic connection via the high pressure accumulator path with the high pressure accumulator device and simultaneously connects the low-pressure side hydraulic connection via the hydraulic balancer path with the hydraulic balancing device. As a result of the actuation of the shuttle valve device by the high pressure present in the respective high pressure side of the closed circuit, the shuttle valve device of the invention ensures in a simple manner that regardless of which hydraulic connection forms the high pressure side and which the low-pressure side of the closed circuit, the respective high-pressure side hydraulic connection is connected to the high pressure accumulator device and the respective low-pressure side hydraulic connection is connected to the hydraulic balancing device.

In one advantageous embodiment of the invention, the shuttle valve device has a first control position in which, via the high pressure accumulator path, the high pressure accumulator device is connected to the first hydraulic connection of the closed circuit and, simultaneously, via the hydraulic balancer path, the hydraulic balancing device is connected to the second hydraulic connection of the closed circuit. The shuttle valve device also has a second control position in which, via the high pressure accumulator path, the high pressure accumulator device is connected to the second hydraulic connection of the closed circuit and simultaneously, via the hydraulic balancer path, the hydraulic balancing device is connected to the first hydraulic connection of the closed circuit. With a shuttle valve device of this type, it becomes possible in a simple manner to optionally connect the high pressure accumulator device and the hydraulic balancing device with each of the two hydraulic connections of the closed circuit. With a shuttle valve device of this type, in combination with the high pressure accumulator device and the pressure balancing device, it is possible in a simple manner for both directions of movement of the consumer to charge the high pressure accumulator device during a braking phase of the consumer and, thus, to achieve a recovery of the braking energy of the consumer. The shuttle valve device further makes it possible to use the energy stored in the high pressure accumulator device to drive the consumer during a subsequent drive phase of the consumer for both directions of movement of the consumer. The hydraulic balancing device thereby ensures the quantity and volume balance in the low-pressure side hydraulic connection of the closed circuit.

In one advantageous embodiment of the invention, the shuttle valve device is in communication by means of a first connecting line with the first hydraulic connection of the closed circuit, by means of a second connecting line with the second hydraulic connection of the closed circuit, by means of a high pressure accumulator line with the high pressure accumulator device, and by means of a balancing line with the hydraulic balancing device. Consequently, the shuttle valve device of the invention can in a simple manner via the high pressure accumulator path connect the high pressure accumulator device to the respective high pressure side hydraulic connection of the closed circuit and, simultaneously, via the hydraulic balancer path, connect the hydraulic balancing device to the respective low-pressure side hydraulic connection of the closed circuit.

In the first control position, the shuttle valve device advantageously connects the first connecting line with the high pressure accumulator line and the second connecting line with the balancing line, and in the second control position connects the first connecting line with the balancing line and the second connecting line with the high pressure accumulator line. With a shuttle valve device of this type, it becomes possible in a simple manner for both directions of movement of the consumer to recover the braking energy during a braking phase of the consumer, and to achieve a drive of the consumer with the high pressure accumulator device during a drive phase of the consumer.

In one advantageous embodiment of the invention, a first control pressure line is provided that leads from the first hydraulic connection of the closed circuit to a control surface of the shuttle valve device that acts in the direction of the first control position, and a second control pressure line that leads from the second hydraulic connection of the closed circuit to a control surface of the shuttle valve that acts in the direction of the second control position. It thereby becomes possible in a simple manner to connect the respective high-pressure side hydraulic connection of the closed circuit with the high pressure accumulator line and the low-pressure side hydraulic connection of the closed circuit with the balancing line.

In one development of the invention, the shuttle valve device has a closed position, in which the high pressure accumulator path and/or the hydraulic balancing path is shut off. With a closed position of the shuttle valve device of this type, the operation of the hybrid function can be deactivated or activated in a simple manner.

In one embodiment of the invention, the shuttle valve device is a four-port, two-position control valve which has the first control position and the second control position. With a control valve of this type, with little added construction effort, the hybrid function can be formed in both directions of movement of the consumer with the high pressure accumulator device and the hydraulic balancing device.

In an alternative embodiment of the invention, the shuttle valve device is a four-port, three-position control valve which has the first control position and the second control position and is provided with the shutoff position as a middle position. With a control valve of this type, with little added construction effort, the hybrid function can be formed in both directions of movement of the consumer with the high pressure accumulator device and the hydraulic balancing device and the hybrid function can be deactivated by the closed position.

In one alternative embodiment of the invention, the shuttle valve device is formed by a plurality of individual valves. The construction of the shuttle valve device in a distributed design with a plurality of individual valves (such as simple shuttle valves) also makes it possible with little added construction effort to form the hybrid function in both directions of movement of the consumer with the high pressure accumulator device and the hydraulic balancing device and to deactivate the hybrid function.

In one advantageous embodiment of the invention, the shuttle valve device has a first shuttle valve which is connected on the input side to the first connecting line and to the second connecting line, and is connected on the output side to the balancing line, and a second shuttle valve which is connected on the input side to the first connecting line and to the second connecting line, and on the output side to the high pressure accumulator line. With two shuttle valves of this type in the form of three-port, two-position valves, it becomes possible with little extra construction effort for the shuttle valve device to connect the respective high-pressure side hydraulic connection of the closed circuit with the high pressure accumulator line and, simultaneously, the respective low-pressure side hydraulic connection of the closed circuit with the balancing line.

In the first control position, the first shuttle valve advantageously connects the second connecting line with the balancing line, and in the second control position connects the first connecting line with the balancing line. The second shuttle valve, in the first control position, connects the first connecting line with the high pressure accumulator line and in the second control position connects the second connecting line with the high pressure accumulator line. With a shuttle valve device of this type formed by two shuttle valves, it becomes possible in a simple manner, in both directions of movement of the consumer, to recover braking energy during a braking phase of the consumer and to drive the consumer with the high pressure accumulator device during a drive phase of the consumer.

In an alternative embodiment of the invention, a controlled deactivation of the hybrid function can be achieved with little extra construction expense, if at least one switching valve with a closed position and an open position is provided which is associated with the high pressure accumulator device and/or the hydraulic balancing device.

It is also contemplated that a proportional valve may be used in place of the shuttle valve device.

In the drive system of the invention, the hydrostatic pump is a displacement pump with a variable displacement volume, preferably a bilaterally variable displacement pump, and the hydrostatic motor is a fixed displacement motor with a fixed displacement volume, or a variable displacement motor with a variable displacement volume.

To vary the displacement volume of the variable displacement pump and/or of the variable displacement motor, there is advantageously an electronic control device in which operating strategies are stored to charge the high pressure accumulator device with hydraulic fluid as a function of the operating conditions of the drive system with energy from the drive motor and/or during braking operation of the consumer with braking energy recovered from the consumer. It thereby becomes possible to charge the high pressure accumulator device under certain operating conditions in which excess energy occurs at the drive motor, and/or during braking operation of the consumer with the braking energy that occurs, to make energy recovery possible. For this purpose, the electronic control device is in communication with corresponding signal generators, by means of which the respective operating condition and/or braking operation of the consumer can be determined, for example, an accelerator pedal device or a brake pedal when the consumer is the traction drive of the vehicle.

In the drive system of the invention, operating strategies are stored in the electronic control device to use the hydraulic fluid from the charged high pressure accumulator device as a function of the operating conditions of the drive system to drive the hydrostatic motor and/or to drive the hydrostatic pump. As a result of the drive of the hydrostatic motor with hydraulic fluid from the high pressure accumulator device, a booster drive of the running drive motor can be achieved. If the hydraulic fluid from the charged high pressure accumulator device is used to drive the hydrostatic pump, the hydrostatic pump can be used as a hydraulic starter of the shutoff drive motor. The high pressure accumulator device can thus be used to boost the running drive motor and/or as a hydraulic starter in the framework of a start-stop function of the drive motor, whereby an economical start-stop function of the drive motor can be achieved on account of the robust construction and operation of the variable displacement machine.

To be able to start the shutoff internal combustion engine (drive motor) in combination with the hydrostatic pump, in one development of the invention the variable displacement motor can be set to a displacement volume of zero and the variable displacement motor for the drive of the hydrostatic pump is set by the hydraulic fluid from the charged high pressure accumulator device to the displacement volume of zero. It thus becomes possible for the hydraulic fluid from the charged high pressure accumulator device not to drive the hydrostatic motor but only to flow to the hydrostatic pump, so that it can be used to start the shutoff drive motor.

The electronic control device is advantageously in communication with a pressure sensor that measures the accumulator charge pressure of the high pressure accumulator device and/or pressure sensors that measure the pressure in the hydraulic connections.

The switching valve can preferably be actuated electrically and is in communication with the electronic control device for its actuation. The hybrid function can therefore be activated and deactivated by means of the electronic control device by a corresponding actuation of the switching valve in a simple manner, depending on the operating status of the drive system.

In one embodiment of the invention, the high pressure accumulator device is formed by a high pressure accumulator and the hydraulic balancing device is formed by a low pressure accumulator. With a high pressure accumulator and a separate low pressure accumulator, both of which can be hydraulic accumulators, an absorption or discharge of energy from the high-pressure side of the closed circuit can be achieved, and the required balancing in terms of the quantity or volume of hydraulic fluid on the low-pressure side can be achieved. The low-pressure accumulator can thereby alternatively be in the form of a tank, for example, a tank that can be depressurized to the environment, or a tank that is under a low precharge pressure, if the pump has a sufficient suction performance. With a tank that is under a precharge pressure, the precharge pressure can be regulated.

In one alternative embodiment of the invention, a double piston accumulator is provided which forms the high pressure accumulator device and the hydraulic balancing device. A double piston accumulator, in contrast to two separate accumulators, i.e., one high-pressure and one low pressure accumulator, has a simple and economical construction. An additional advantage of a double piston accumulator is that with a double piston accumulator, it is easily possible in a hydrostatic drive with a closed circuit to achieve a theoretically exact balancing of the quantity of hydraulic fluid in the low-pressure side hydraulic connection during the extraction or the addition of a quantity of hydraulic fluid on the high-pressure side hydraulic connection, so that the quantity and volume balance in the two hydraulic connections of the closed circuit is guaranteed with little added construction effort or expense.

In one alternative embodiment of the invention, the high pressure accumulator device is formed by a high pressure accumulator and the hydraulic balancing device comprises a hydrostatic drive unit in an accumulator flow path between one of the two hydraulic connections and the high pressure accumulator and an additional hydrostatic drive unit in a tank flow path between the other of the two hydraulic connections and a tank. With two hydrostatic drive units that can be connected with each other in a drive connection, it becomes possible to achieve a balancing of quantity and volume in the respective low-pressure side hydraulic connection in combination with only one high pressure accumulator.

The two hydrostatic drive units can be individual drive units that are connected to each other by means of a shaft or a transmission, and can be in a drive connection with each other.

To achieve a simple construction and keep the space required for the two hydrostatic power units small, it is particularly advantageous if the hydrostatic drive unit and the additional hydrostatic power unit are in the form of a hydrostatic dual-flow double drive unit. One advantage of a dual-flow double drive unit is that in a hydrostatic drive with a closed circuit, it is possible in a simple manner to achieve a theoretically exact compensation of the quantity of hydraulic fluid in the low-pressure side hydraulic connection during the extraction or addition of a quantity of hydraulic fluid at the high-pressure side hydraulic connection (if the two hydrostatic drive units have the same displacement volumes) so that the quantity and volume balance in the two hydraulic connections of the closed circuit can be guaranteed with little extra construction effort or expense.

In one alternative embodiment of the invention, the high pressure accumulator device is formed by a high pressure accumulator and the hydraulic balancing device is formed by a discharge device and a charging device of the closed circuit. With a discharge device and a charging device of the closed circuit, it likewise becomes possible to achieve a quantitative and volume balancing in the respective low-pressure side hydraulic connection in combination with only one high pressure accumulator.

The charging device can have a charging pump in the form of a fixed displacement pump. The delivery volume of the charging pump is then designed so that when it is charging the high pressure accumulator, the charging pump adds the equivalent quantity of hydraulic fluid to the low-pressure side hydraulic connection of the closed circuit that is extracted from the high-pressure side hydraulic connection for the charging of the high pressure accumulator.

In one advantageous embodiment of the invention, the charging device has a charging pump which is in the form of a variable displacement pump with a variable displacement volume, the displacement volume of which is regulated as a function of the pressure in the low-pressure side hydraulic connection. If a specified amount of hydraulic fluid is extracted via the high pressure accumulator in a charging operation from the high-pressure side hydraulic connection of the closed circuit, by means of the charging pump which displacement volume is controlled by the pressure that is present in the low-pressure side hydraulic connection, the corresponding quantity of hydraulic fluid is made up by the charging pump in the low-pressure side hydraulic connection of the closed circuit to meet the demand.

If a determined quantity of hydraulic fluid is added from the high pressure accumulator in discharge operation into the high-pressure side hydraulic connection of the closed circuit, the corresponding quantity of hydraulic fluid is diverted via the discharge device from the low-pressure side hydraulic connection of the closed circuit and discharged. With a variable charging pump regulated by the pressure in the low-pressure side hydraulic connection and a discharge device, the quantity and volume balancing at the low-pressure side hydraulic connection of the closed circuit can be achieved simply, compactly, and economically. The charging pump, which is in the form of a variable displacement pump, the displacement of which is regulated by the pressure in the low-pressure side hydraulic connection, thereby makes it possible to balance the quantity and volume of hydraulic fluid as necessary, as a result of which the charging pump, in operating conditions in which the hybrid function is not activated and, thus, no balancing of the quantity or volume of hydraulic fluid flowing into the high pressure accumulator is necessary, does not deliver any excess hydraulic fluid, which must be discharged to the tank via a pressure relief valve and, therefore, causes corresponding losses.

The consumer can be a slewing gear of a vehicle which is driven by the hydrostatic motor. With the hybrid function of the invention, on a vehicle with a slewing gear, such as a machine in the form of an excavator, energy can be recovered during braking operation of the slewing gear and the drive motor can be boosted during acceleration of the slewing gear.

Alternatively, the consumer can be the traction drive of a vehicle, for example, a drive axle driven by the hydrostatic motor with at least two driven drive wheels. With the hybrid function of the invention, on a vehicle with a traction drive comprising a drive axle, energy can be recovered during braking operation of the vehicle and the drive motor can be assisted during the acceleration of the vehicle.

Alternatively, the consumer can be a winch, such as a crane winch.

In one development of the invention, the hydrostatic drive of the invention can be a continuously variable hydrostatic branch of a power split transmission.

The invention further relates to a vehicle with a hydrostatic drive of the invention. With the hydraulically controlled and purely hydraulically actuated shuttle valve device of the invention, it becomes possible to create a serial hybrid drive for the hybrid function in a vehicle in a simple and economical manner, as well as one that occupies a small amount of space.

BRIEF DESCRIPTION OF THE DRAWINGS

Additional advantages and details of the invention are described in greater detail below with reference to the exemplary embodiments illustrated in the accompanying schematic figures, in which like reference numbers identify like parts throughout.

DESCRIPTION OF THE PREFERRED EMBODIMENTS

Figure 1:
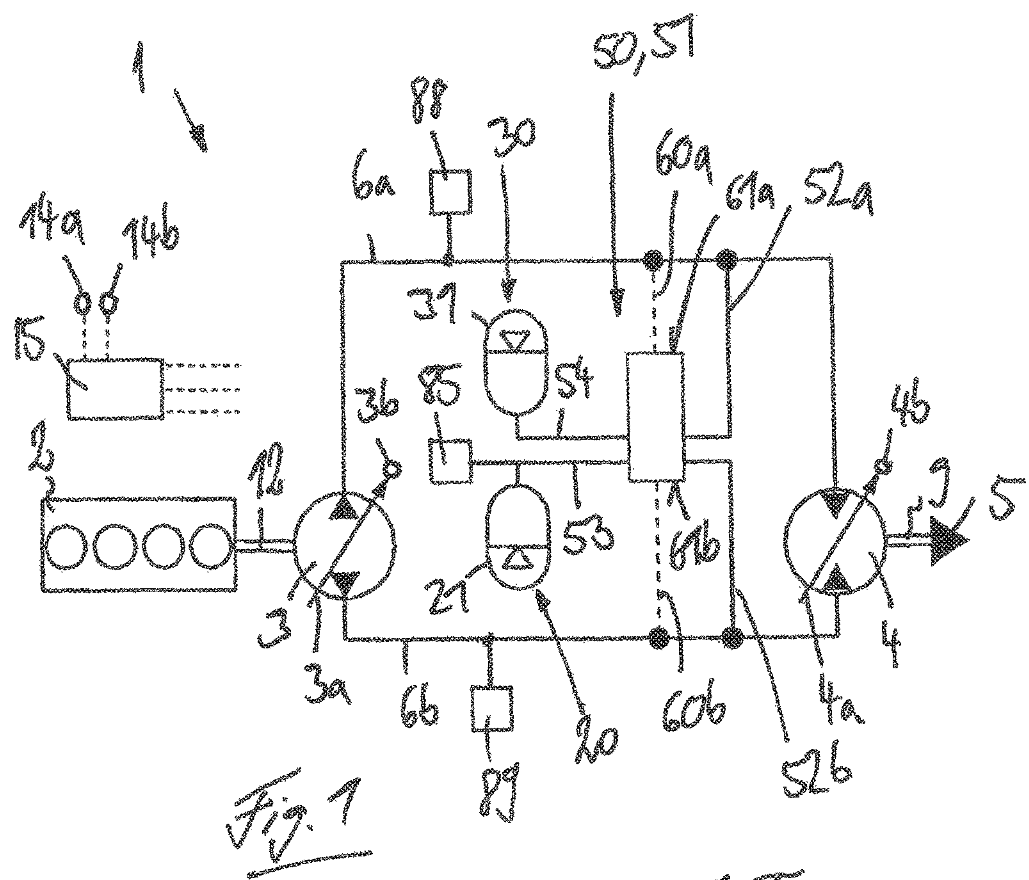
FIG. 1 shows a first embodiment of a hydrostatic drive system of the invention with a schematically illustrated shuttle valve device of the invention.

FIGS. 1 to 13 illustrate a drive train of a vehicle with a hydrostatic drive system 1 of the invention.

The hydrostatic drive system 1 has a hydrostatic pump 3 which is driven by a drive motor 2 and is connected in the closed circuit with a hydrostatic motor 4. The motor 4 is in a drive connection by means of an output shaft 9 with a consumer. The closed circuit is formed by a first hydraulic connection 6*a* and a second hydraulic connection 6*b*.

In the illustrated embodiment, the drive motor 2 is an internal combustion engine.

The consumer 5 can be a traction drive (not illustrated in detail) of a vehicle, which comprises, for example, a drive axle with two driven wheels. The output shaft 9 of the motor 4 is in connection with a differential transmission of the drive axle, which drives the wheels by means of corresponding drive shafts. The drive axle can be driven directly by the motor 4 or, alternatively, with the interposition of a geared transmission.

For driving, the pump 3 is in an operative connection with a drive shaft 12 of the drive motor 2. The pump 3 is a variable displacement pump, the displacement of which can be varied in both directions from a zero position in which the displacement volume is zero, so that the pump 3, depending on the direction of actuation, can deliver into both hydraulic connections 6*a*, 6*b*.

The displacement volume of the pump 3 can be controlled electrically or electro-hydraulically, in particular electro-proportionally. For this purpose, the displacement volume control device 3*a* of the pump can be electrically actuated by means of an electrical actuator device 3*b*, which is in communication with an electronic control device 15 for its actuation.

The motor 4 can be a fixed displacement motor. In the illustrated exemplary embodiment, the motor 4 is a variable displacement motor. The displacement volume of the motor 4 can be controlled electrically or electro-hydraulically, in particular, electro-proportionally. For this purpose, a displacement volume control device 4*a* of the motor 4 can be electrically actuated by means of an electrical actuator device 4*b*, which is in communication with the electronic control device 15 for its actuation.

Figure 2:
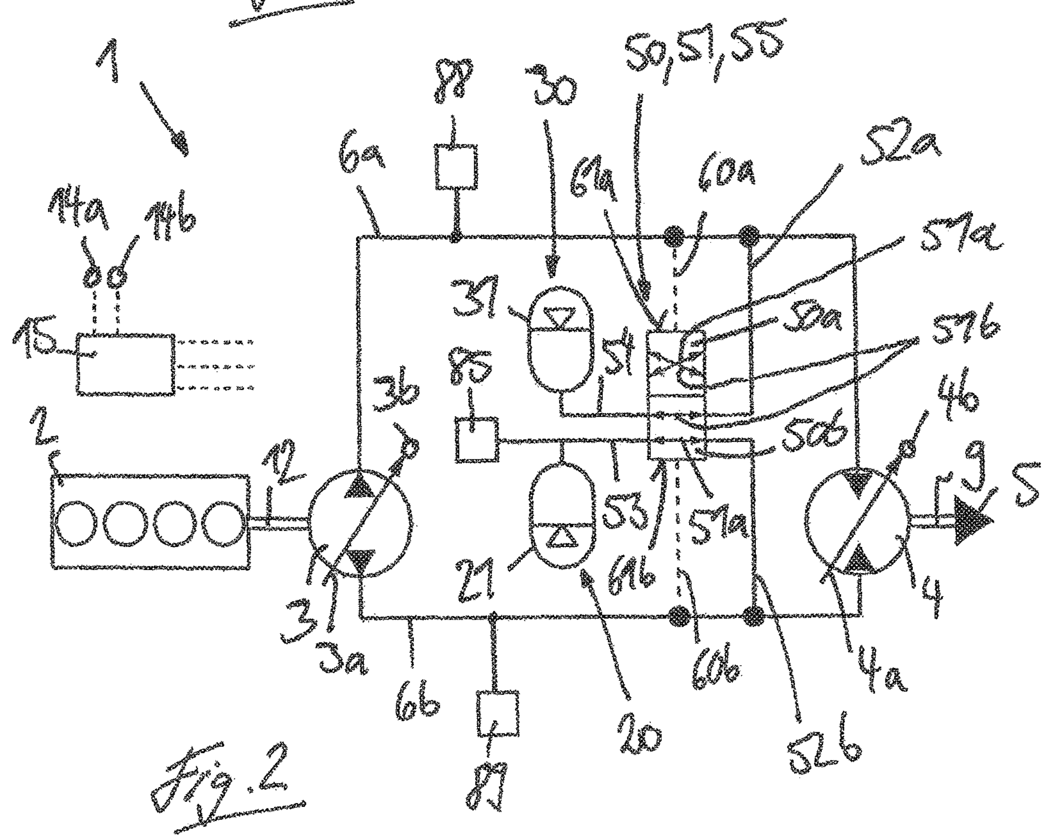
FIG. 2 shows a first embodiment of the shuttle valve device claimed by the invention illustrated in FIG. 1.

The input side the electronic control device 15 is also in communication with signal generators 14*a*, 14*b*, for example, an accelerator pedal device and a brake pedal device. For the measurement of the pressures in the two hydraulic connections 6*a*, 6*b* (as illustrated in FIGS. 1 and 2) pressure sensors 88, 89 are provided which are in communication with the control device 15.

Depending on the direction of delivery of the pump 3 and depending on the operating status (drive phase or braking phase) of the consumer 5, one of the hydraulic connections 6*a* or 6*b* forms the high-pressure side hydraulic connection of the closed circuit and the respective other hydraulic connection 6*b* or 6*a* forms the low-pressure side hydraulic connection of the closed circuit.

If the displacement volume control device 3*a* of the pump 3 is set so that the pump 3 delivers into the first hydraulic connection 6*a*, the drive system is in a drive phase and the motor 4 is driven in a first direction of movement, which for the illustrated traction drive as the consumer 5, for example, corresponds to the forward direction of travel of the vehicle. In the drive phase in the first direction of movement of the consumer 5, the first hydraulic connection 6*a* therefore represents the high-pressure side hydraulic connection and the second hydraulic connection 6*b* represents the low-pressure side hydraulic connection of the closed circuit. If during the braking of the consumer 5, the drive system moves into a braking phase, the pressure relationships in the hydraulic connections 6*a*, 6*b* are reversed. The motor 4 operates as a pump and delivers hydraulic fluid via the second hydraulic connection 6*b* to the pump 3 which functions as a motor. During the braking phase in the first direction of movement of the consumer 5, the second hydraulic connection 6*b* therefore represents the high-pressure side hydraulic connection and the first hydraulic connection 6*a* represents the low-pressure side hydraulic connection of the closed circuit.

If the displacement volume control device 3*a* of the pump 3 is set so that the pump 3 delivers into the second hydraulic connection 6*b*, the drive system is in a drive phase and the motor 4 is driven in a second direction of movement, which for the illustrated traction drive as the consumer 5, for example, corresponds to the reverse direction of travel of the vehicle. In the drive phase in the second direction of movement of the consumer 5, the second hydraulic connection 6*b* therefore represents the high-pressure side hydraulic connection and the first hydraulic connection 6*a* represents the low-pressure side hydraulic connection of the closed circuit. If during the braking of the consumer 5, the drive moves into a braking phase, the pressure relationships in the hydraulic connections 6*a*, 6*b* are reversed. The motor 4 functions as a pump and delivers hydraulic fluid via the first hydraulic connection 6*a* to the pump 3, which functions as a motor. In the braking phase in the second direction of movement of the consumer 5, the first hydraulic connection 6*a* represents the high-pressure side hydraulic connection and the second hydraulic connection 6*b* represents the low-pressure side hydraulic connection of the closed circuit.

Depending on the design of the vehicle, the drive train can comprise an additional hydraulic system, such as the working hydraulics of a mobile machine.

The illustrated drive train is a serial hybrid, for which purpose of the closed circuit is provided with a high pressure accumulator device 20, which can be connected for the absorption of energy and for the discharge of energy out of and into the closed circuit respectively with the high-pressure side hydraulic connection 6*a*, 6*b* and, thus, the high-pressure side of the closed circuit.

For the necessary quantitative and volume balancing in the two hydraulic connections 6*a*, 6*b* of the closed circuit during charging and discharging of the high pressure accumulator device 20, the respective low-pressure side hydraulic connections 6*b*, 6*a* can each be connected with a hydraulic balancing device 30.

A valve device 50 is provided for the control of the simultaneous connection of the high pressure accumulator device 20 with the respective high-pressure side hydraulic connection 6*a*, 6*b* and of the hydraulic balancing device 30 with the respective low-pressure side hydraulic connection 6*b*, 6*a*.

The invention teaches that the valve device 50 is a hydraulically controlled shuttle valve device 51 which is connected at the two hydraulic connections 6*a*, 6*b* to the high pressure accumulator device 20 and the hydraulic balancing device 30. The shuttle valve device 51 of the invention is in connection for its actuation with the two hydraulic connections 6*a*, 6*b* of the closed circuit. The shuttle valve device 51 of the invention (as illustrated in greater detail in FIG. 2), has a high pressure accumulator path 51*a* and a hydraulic balancing path 51*b*.

The shuttle valve device 51 of the invention makes it possible to optionally connect the high pressure accumulator device 20 and the hydraulic balancing device 30 with each of the two hydraulic connections 6*a* and/or 6*b*. The shuttle valve device 51 makes it possible, for both directions of movement of the consumer 5, to charge the high pressure accumulator device 20 with energy from the drive motor 2 and/or with braking energy during a braking phase of the consumer 5, and during the discharge of the high pressure accumulator device 20, to drive the consumer 5 in both directions of movement. The quantitative and volume balancing in the two hydraulic connections 6*a*, 6*b* of the closed circuit is guaranteed by means of the hydraulic balancing device 30.

As illustrated in greater detail in FIG. 2, the shuttle valve device 51, in a first control position 50*a*, connects the high pressure accumulator device 20 by means of the high pressure accumulator path 51*a* with the first hydraulic connection 6*a* of the closed circuit and simultaneously the hydraulic balancing device 30 by means of the hydraulic balancing path 51*b* with the second hydraulic connection 6*b* of the closed circuit. In a second control position 50*b* of the valve device 50, the high pressure accumulator device 20 is connected by means of the high pressure accumulator path 51*a* to the second hydraulic connection 6*b* of the closed circuit and simultaneously the hydraulic balancing device 30 is connected by means of the hydraulic balancing path 51*b* to the first hydraulic connection 6*a* of the closed circuit.

The shuttle valve device 51 is connected by means of the first connecting line 52*a* with the first hydraulic connection 6*a* of the closed circuit and by means of a second connecting line 52*b* with the second hydraulic connection 6*b* of the closed circuit. The shuttle valve device 51 is connected with the high pressure accumulator device 20 by means of a high pressure accumulator line 53. The shuttle valve device 51 is also connected by means of a balancing line 54 with the hydraulic balancing device 30. For the measurement of the charging pressure of the high pressure accumulator device 20 (as illustrated in FIGS. 1 and 2) a pressure sensor 85 is provided which is in communication with the electronic control device 15.

The shuttle valve device 51 of the invention is constructed so that the shuttle valve device 51, as a function of the high pressure present in the high-pressure side hydraulic connection 6*a*, 6*b* of the closed circuit, connects the high-pressure side hydraulic connection 6*a*, 6*b* by means of the high pressure accumulator path 51*a* with the high pressure accumulator device 20, and simultaneously connects the low-pressure side hydraulic connection 6*b*, 6*a* by means of the hydraulic balancing path 51*b* with the hydraulic balancing device 30.

In the first control position 50*a*, the shuttle valve device 51 connects the first connecting line 52*a* with the high pressure accumulator line 53 and the second connecting line 52*b* with the balancing line 54. In the second control position 50*b*, the shuttle valve device 51 connects the connecting line 52*a* with the balancing line 54 and the second connecting line 52*b* with the high pressure accumulator line 53.

The shuttle valve device 51 of the invention can be actuated hydraulically and for actuation is in communication with the hydraulic connections 6*a*, 6*b* of the closed circuit. The shuttle valve device 51 of the invention forms a hydraulically controlled directional control valve, with which the high pressure accumulator device 20 can be connected respectively with the corresponding high-pressure side hydraulic connection 6*a* or 6*b* and the hydraulic balancing device 30 can be connected respectively with the corresponding low-pressure side hydraulic connector 6*b* or 6*a* of the closed circuit.

For the hydraulic actuation of the shuttle valve 51 of the invention, a first control pressure line 60*a* is provided which runs from the first hydraulic connection 6*a* of the closed circuit to a control surface 61*a* of the shuttle valve device 51 that acts in the direction of the first position 50*a*, and a second control pressure line 60*b*, which runs from the second hydraulic connection 6*b* of the closed circuit to a control surface 61*b* of the shuttle valve device 51 that acts in the direction of the second control position 50*b*.

If the first hydraulic connection 6*a* forms the high-pressure side of the closed circuit, the shuttle valve device 51 is actuated by means of the first control pressure line 60*a* into the first control position 50*a*, in which the first, high-pressure side hydraulic connection 6*a* is connected with the high pressure accumulator device 20 and the second, low-pressure side hydraulic connection 6*b* is connected with the hydraulic balancing device 30. If the second hydraulic connection 6*b* forms the high-pressure side of the closed circuit, by means of the second control pressure line 60*b* the shuttle valve device 51 is actuated into the second control position 50*b*, in which the second, high-pressure side hydraulic connection 6*b* is connected with the high pressure accumulator device 20 and the first, low-pressure side hydraulic connection 6*a* is connected with the hydraulic balancing device 30. Therefore, if the high pressure accumulator device 20 is charged with hydraulic fluid from the high-pressure side hydraulic connection 6*a* or 6*b*, or if the high pressure accumulator device 20 discharges hydraulic fluid into the high-pressure side hydraulic connection 6*a* or 6*b*, the corresponding compensation of hydraulic fluid takes place at the respective low-pressure side hydraulic connection 6*b* or 6*a* to ensure the quantitative and volume balance in the two hydraulic connections 6*a*, 6*b* of the closed circuit.

Figure 3:
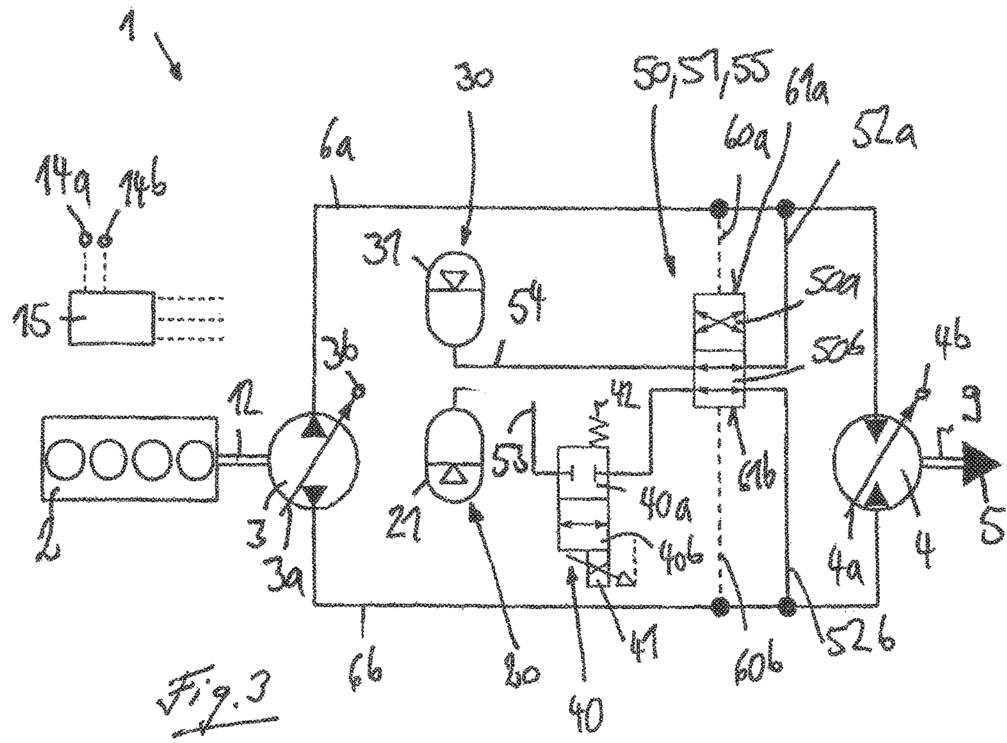
FIG. 3 shows a development of FIG. 2.

FIG. 3 illustrates a development of FIG. 2, wherein a switching valve 40 is provided with a closed position 40*a* and an open position 40*b*, which switching valve 40 is associated with the high pressure accumulator device 20. In the illustrated exemplary embodiment, the switching valve 40 is located in the high pressure accumulator line 53.

The switching valve 40 can be actuated electrically and for this purpose is in communication with an electrical actuator device 41. The electrical actuator device 41 is in communication for its actuation with the electronic control device 15. In the illustrated exemplary embodiment, the switching valve 40 is actuated into the closed position 40*a* by means of the spring 42 and can be actuated into the open position 40*b* by actuation of the electrical actuator device 41. It goes without saying that alternatively, the spring 42 can actuate the switching valve 40 into the open position 40*b* and the electrical actuator device 41 can actuate the switching valve 40 when actuated into the closed position 40*a*. The switching valve 40 makes possible a controlled deactivation of the hybrid function in the closed position 40*a* and a controlled activation of the hybrid function in the open position 40*b*.

In FIGS. 1 to 3, the high pressure accumulator device 20 is formed by a high pressure accumulator 21 and the hydraulic balancing device 30 is formed by a low pressure accumulator 31. The high pressure accumulator 21 and the low pressure accumulator 31 can each be hydraulic accumulators.

Figure 4:
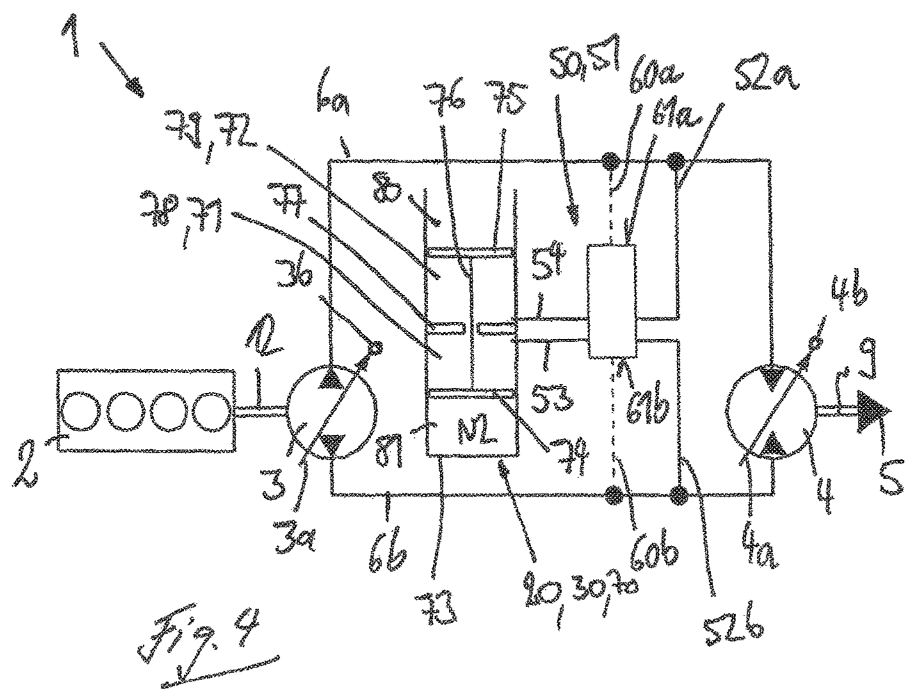
FIG. 4 shows a second embodiment of a hydrostatic drive system of the invention with a schematically illustrated shuttle valve device claimed by the invention.
Figures 5, 6:
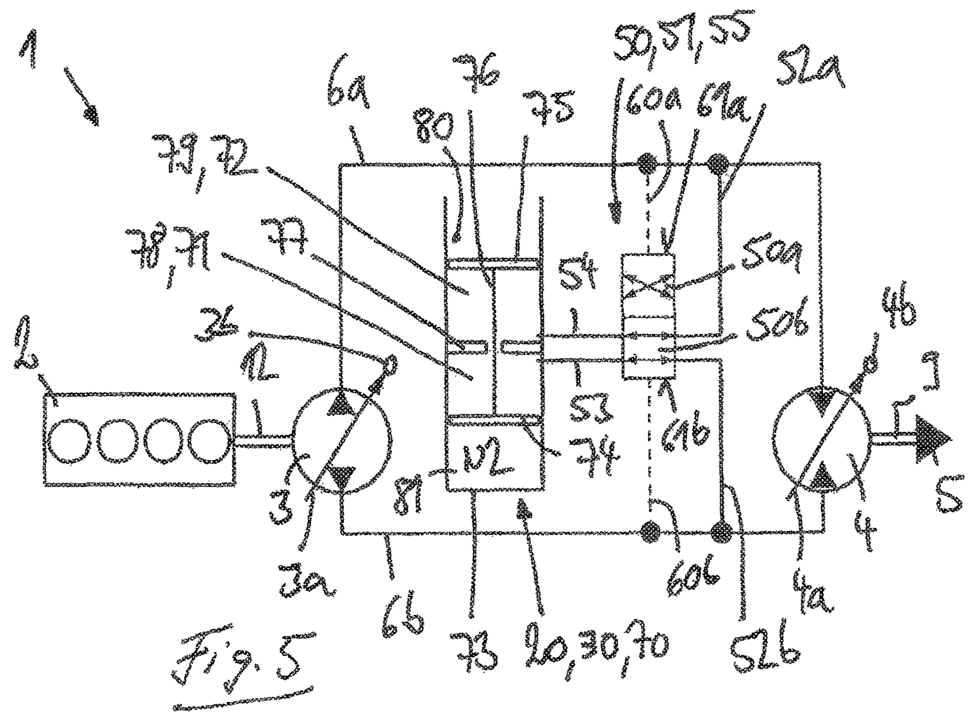
FIG. 5 is the same as FIG. 4 with an embodiment of the shuttle valve device of the invention as illustrated in FIG. 2.
FIG. 6 shows a development of FIG. 4 as illustrated in FIG. 3.

FIGS. 4 to 6 illustrate an alternative embodiment of the high pressure accumulator device 20 and the hydraulic balancing device 30. The high pressure accumulator device 20 and the hydraulic accumulator device 30 in FIGS. 4 to 6 are formed by a double piston accumulator 70.

The double piston accumulator 70 has the function of the high pressure accumulator device 20 and the function of the hydraulic balancing device 30 and for this purpose has a high-pressure-side pressure chamber 71 which forms the high pressure accumulator device 20, and a low-pressure side pressure chamber 72 which forms the hydraulic balancing device 30.

The high-pressure side pressure chamber 71 of the double piston accumulator 70 is connected to the high pressure accumulator line 53 of the shuttle valve device 51. The low-pressure side pressure chamber 72 of the double piston accumulator 70 is connected to the balancing line 54 of the shuttle valve device 51.

The double piston accumulator 70 has a housing 73, in which two pistons 74, 75 are located so that they can be displaced longitudinally. The two pistons 74, 75 are rigidly connected to each other by means of a coupling part 76, such as a piston rod. Between the two pistons 74, 75, the housing 73 is provided with a partition 77, through which the coupling part 76 extends. The coupling part 76 is sealed and guided in the partition 77 in a manner which is not illustrated in any further detail. The inner end surfaces of the two pistons 74, 75, with the housing 73 and the partition 77, form the boundaries of respective pressure chambers 78, 79. The pressure chambers 78, 79 surround the coupling part 76 and are therefore realized in the form of coupling-part-side pressure chambers. The outer end surface of the piston 75, together with the housing 73, forms the boundary of a pressure chamber 80 which is opposite the pressure chamber 79. In the illustrated exemplary embodiment, the pressure chamber 79 is depressurized. In the illustrated exemplary embodiment, the pressure chamber 80 is vented for depressurization. The outer end surface of the piston 74, together with the housing 73 and a housing cover, forms the boundaries of a pressure chamber 81 which is opposite the pressure chamber 78. The pressure chambers 80, 81 are piston-side pressure chambers. The pressure chamber 81 in the illustrated exemplary embodiment is under a pre-pressure. In the illustrated exemplary embodiment, a gas pre-pressure is provided as the pre-pressure, for example, nitrogen, so that the double piston accumulator 70 is a hydro-pneumatic accumulator.

The inner end surfaces of the two pistons 74, 75 and the outer end surface of the two pistons 74, 75 each have the same area.

In the illustrated exemplary embodiment, the coupling-part-side pressure chamber 78 of the piston 74 of the double piston accumulator 70 forms the high-pressure side pressure chamber 71 and, thus, the high pressure accumulator device 20. The opposite coupling-part-side pressure chamber 79 of the piston 75 of the double piston accumulator 70 forms the low-pressure side pressure chamber 72 and, thus, the hydraulic balancing device 30.

Therefore, pressure chambers with equal piston surfaces of the two pistons 74, 75 respectively form the high-pressure side pressure chamber 71 and the low-pressure side pressure chamber 72 of the double piston accumulator 70. In this manner, it is ensured that the same quantity of hydraulic fluid that is extracted by means of the high pressure accumulator line 53 from the high-pressure side hydraulic connection of the closed circuit, or the same quantity that is added into the high-pressure side hydraulic connection of the closed circuit, is added by means of the balancing line into the low-pressure side hydraulic connection of the closed circuit or is extracted from the low-pressure side hydraulic connection of the closed circuit.

It goes without saying that the double piston accumulator 70 can also absorb or discharge hydraulic fluid to both piston-side pressure chambers 80, 81. For this purpose, for example, the pressure chamber 78 is under a pre-charge and the high-pressure side pressure chamber is formed by the pressure chamber 81. The piston side pressure chamber 80 must in this case be closed by means of a housing cover, so that the pressure chamber 80 can be in the form of the low-pressure side pressure chamber. The pressure chamber 79 must then be depressurized.

Figure 7:
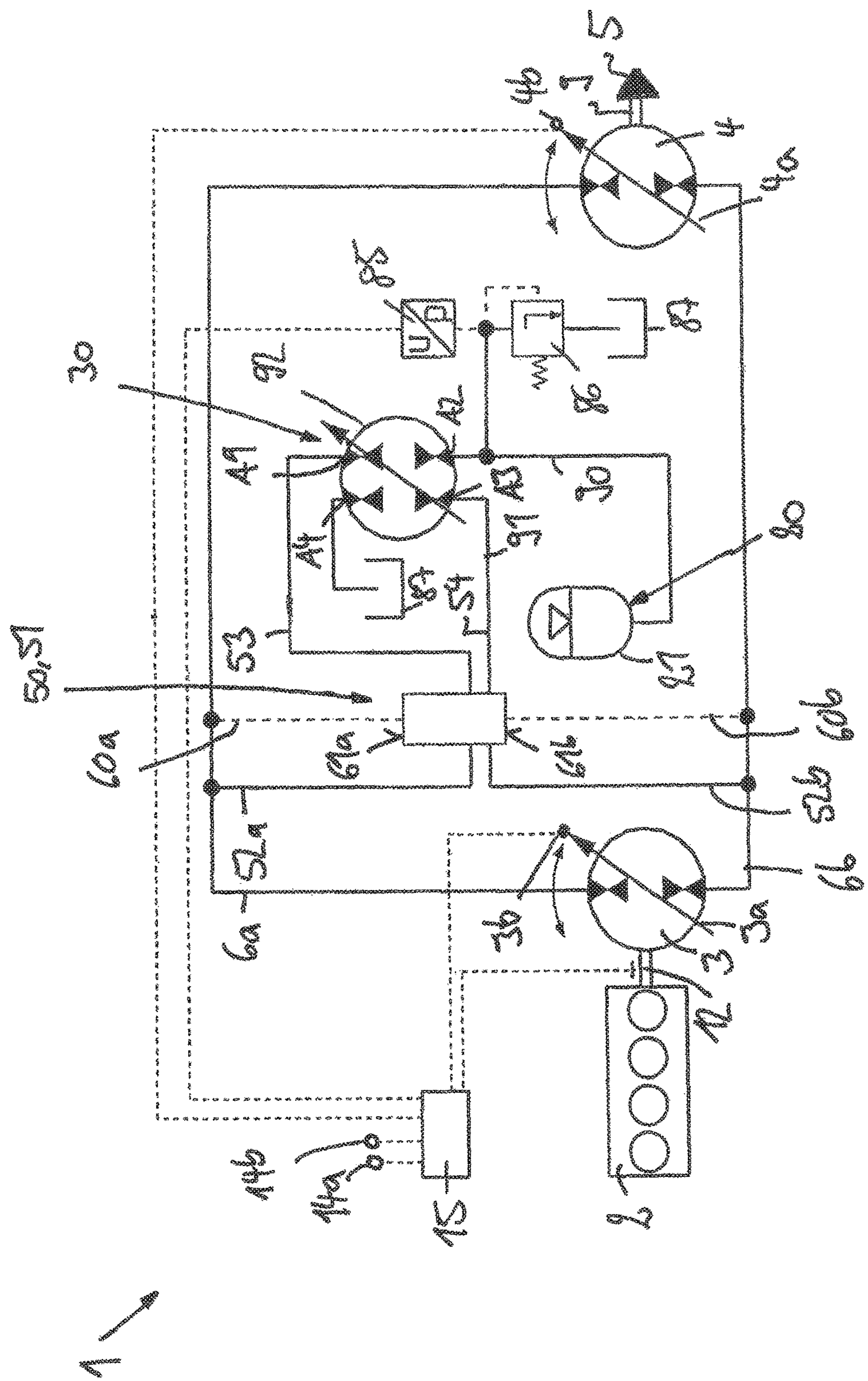
FIG. 7 shows a third embodiment of the hydrostatic drive system of the invention with a schematically illustrated shuttle valve device of the invention.
Figure 8:
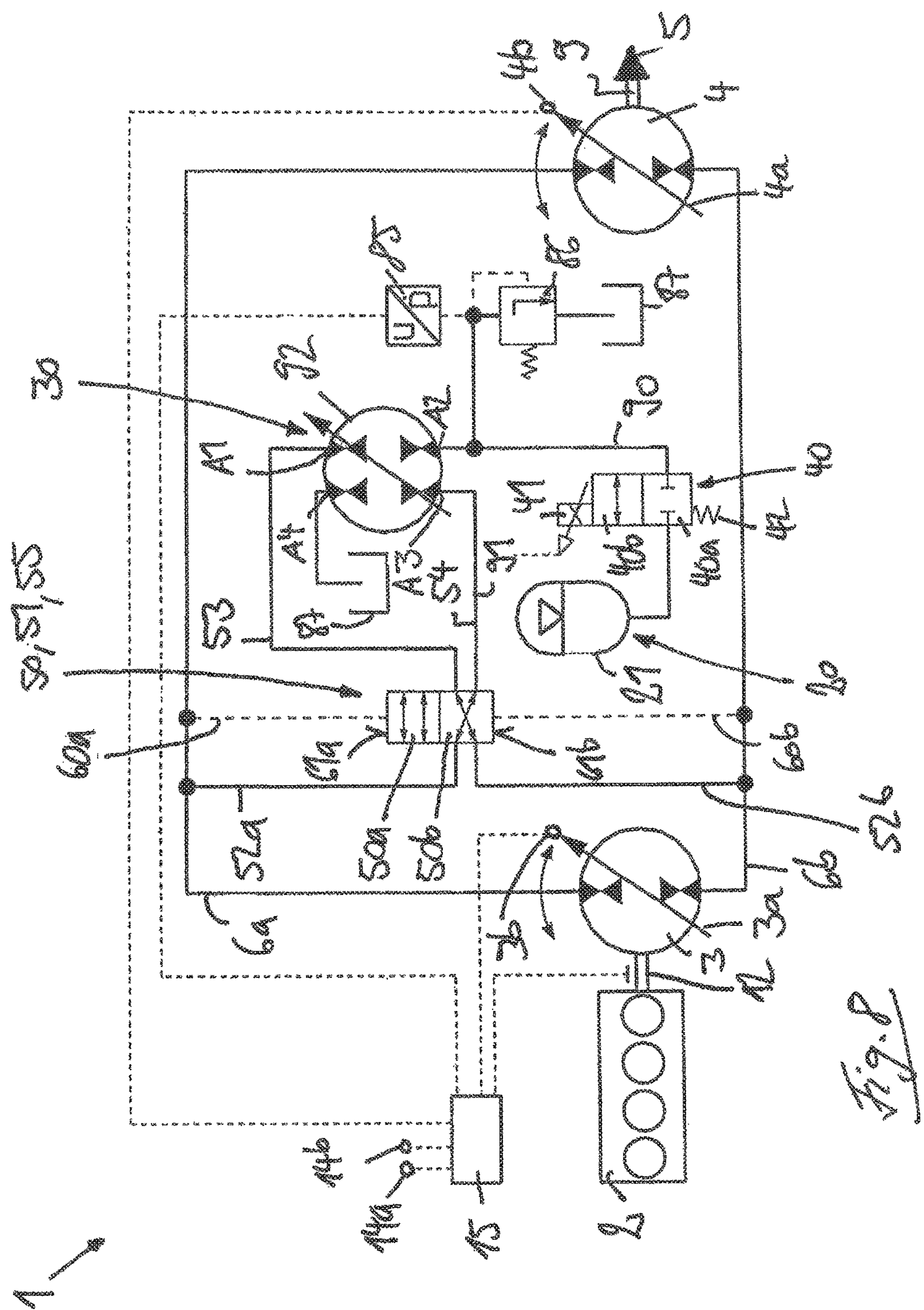
FIG. 8 shows a hydrostatic drive system with a shuttle valve device of the invention as illustrated in FIGS. 3 to 6.

FIGS. 7 and 8 illustrate an alternative embodiment of the high pressure accumulator device 20 and of the high pressure balancing device 30. In FIG. 7, the hydraulically actuated shuttle valve device 51 of the invention is illustrated schematically, analogous to FIGS. 1 and 4. FIG. 8 illustrates a development according to FIGS. 3 and 6 with the additional switching valve 40 in the high pressure accumulator line 53.

In FIGS. 7 and 8, a pressure sensor 85 which is in communication with the electronic control device 15 is also provided to measure the charge pressure in the high pressure accumulator device 20.

To protect the accumulator charging pressure of the high pressure accumulator device 20, a pressure safety valve 86, such as a pressure relief valve, is associated with the high pressure accumulator line 53 and is connected on the output side with a tank 87.

In FIGS. 7 and 8, the high pressure accumulator device 20 is formed by a high pressure accumulator 21 such as a hydraulic accumulator. The hydraulic balancing device 30 comprises a hydrostatic drive unit in an accumulator flow path 90 between the high-pressure side hydraulic connections 6*a*, 6*b* and the high pressure accumulator 21 and an additional hydrostatic drive unit in a tank flow path 91 between the low-pressure side hydraulic connections 6*b*, 6*a* and the tank 87.

In the illustrated exemplary embodiment, the hydrostatic drive unit and the additional hydrostatic drive unit are in the form of a hydrostatic dual-flow double drive unit 92, which delivers two separate delivery flows, one of which forms the accumulator flow path 90 and the other the tank flow path 91.

The accumulator flow path 90 is located between the high pressure accumulator line 53 and the high pressure accumulator 21. For this purpose, the high pressure accumulator line 53 of the shuttle valve device 51 leads to a first connection A1 of the double drive unit 92 and from a second connection A2 of the double drive unit 92 to the high pressure accumulator 21. The double drive unit 92 therefore delivers the first delivery flow to both connections A1, A2 and with the two connections A1, A2 forms the accumulator flow path 90 between the high pressure accumulator line 53 of the shuttle valve device 51 and the high pressure accumulator 21.

The tank flow path 91 is formed between the balancing line 54 of the shuttle valve device 51 and the tank 87. For this purpose, the balancing line 54 runs to a third connection A3 of the double drive unit 92 and from a fourth connection A4 of the double drive unit 92 to the tank 87. The double drive unit 92 therefore, delivers the second delivery flow to the two additional connections A3, A4 and with the two connections A3, A4 forms the tank flow path 91 between the balancing line 54 of the shuttle valve device 51 and the tank 87.

The dual-flow double drive unit 92 is provided with equal displacement volumes for the accumulator flow path 90 and the tank flow path 91, so that the double drive unit 92 delivers equal delivery flows.

During charging operation of the high pressure accumulator 21, hydraulic fluid flows via the accumulator flow path 90 in a first direction of flow from the high pressure accumulator line 53, which is connected by means of the shuttle valve device 51 to the high-pressure side hydraulic connection 6*a*, 6*b*, into the high pressure accumulator 21, whereupon the hydrostatic drive unit of the double drive unit 92 associated with the accumulator flow path 90 is actuated in a first direction. The hydraulic fluid flowing into the high pressure accumulator 21 in the accumulator flow path 90 also drives the other hydrostatic drive unit of the double drive unit 92 which is associated with the tank flow path 91, as a result of which the other hydrostatic drive unit, via the tank flow path 91, delivers hydraulic fluid in a first flow direction from the tank 87 into the balancing line 54, which is connected by means of the shuttle valve device 51 to the low-pressure side hydraulic connection 6*b*, 6*a*, so that hydraulic fluid is delivered into the low-pressure side hydraulic connection 6*b*, 6*a*.

In discharge operation of the high pressure accumulator 21, hydraulic fluid flows via the accumulator flow path 90 in a second, opposite direction of flow from the high pressure accumulator 21 into the high pressure accumulator line 23, which is connected by means of the shuttle valve device to the high-pressure side hydraulic connection 6*a*, 6*b*, whereby the hydrostatic drive unit of the double drive unit 92 associated with the accumulator flow path 90 is actuated in a second, opposite direction. The hydraulic fluid flowing out of the high pressure accumulator 21 in the accumulator flow path 90 also drives the other hydrostatic drive unit of the double drive unit 92 which is associated with the tank flow path 91, as a result of which the other hydrostatic drive unit, via the tank flow path 91, diverts hydraulic fluid in a second, opposite direction of flow from the balancing line 54, which is connected by means of the shuttle valve device 51 to the low-pressure side hydraulic connection 6*b*, 6*a*, into the tank 87.

Because the dual-flow double drive unit 92 is provided with equal displacement volumes for the accumulator flow path 90 and the tank flow path 91, and thus the two delivery flows are equal, and the hydraulic fluid fed to or extracted from the high pressure accumulator 21 via the accumulator flow path 90 drives both power units of the double power unit 92 equally, it is ensured that the theoretically exactly equal quantity of hydraulic fluid that is extracted by means of the accumulator flow path 90 from the high-pressure side hydraulic connection 6*a*, 6*b* of the closed circuit or is fed into the high-pressure side hydraulic connection of the closed circuit, is fed via the tank flow path 91 in the low-pressure side hydraulic connection 6*b*, 6*a* of the closed circuit or is extracted from the low-pressure side hydraulic connection 6*b*, 6*a* of the closed circuit.

The dual-flow double drive unit 92 therefore ensures, during charging operation and discharging operation of the high pressure accumulator 21, the quantitative and volume balance in the two hydraulic connections 6*a*, 6*b* of the closed circuit. If there are slight differences in displacement volumes of the two drive units of the dual-flow dual drive unit 91, they can be equalized by a charging device which is not described in further detail.

The double drive unit 92 can be a variable displacement machine or a fixed displacement machine.

In FIGS. 2, 3, 5, 6, and 8, the hydraulically actuated shuttle valve device of the invention is a four-port, two-position control valve 55, which has the first control position 50*a* and the second control position 50*b*. The four-port, two-position control valve 55 is provided with the high pressure accumulator path 51*a* and the hydraulic balancing path 51*b*.

Figure 9:
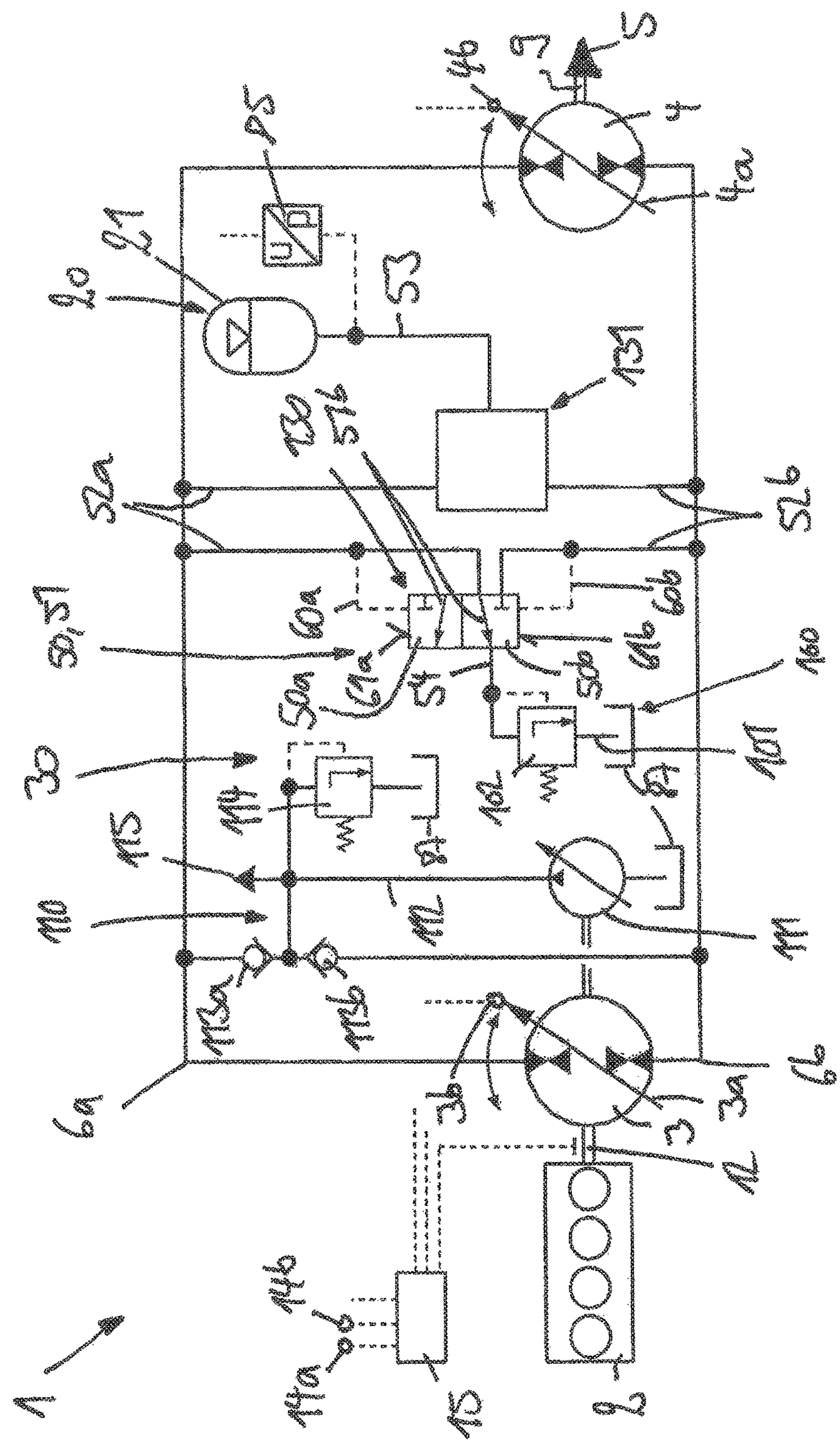
FIG. 9 is a fourth embodiment of a hydrostatic drive system of the invention with a second embodiment of a shuttle valve device of the invention in a partly schematic illustration.
Figure 10:
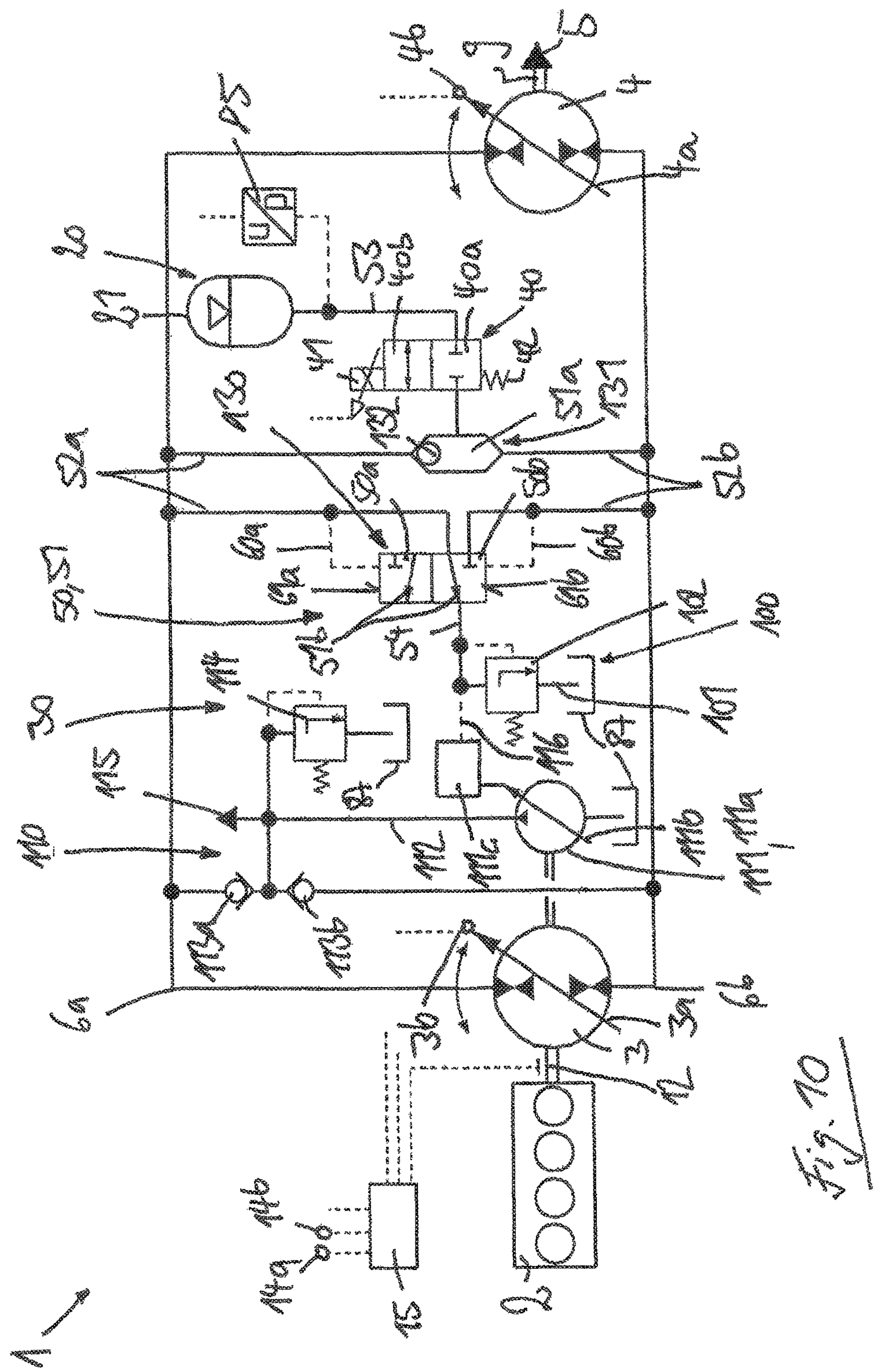
FIG. 10 is an embodiment of FIG. 9.

FIGS. 9 and 10 illustrate an alternative embodiment of the high pressure accumulator device 20 and of the hydraulic balancing device 30.

The high pressure accumulator device 20 is formed by a high pressure accumulator 21, such as a hydrostatic accumulator. The hydraulic balancing device 30 is formed by a discharge device 100 and a charging device 110 of the closed circuit.

The discharge device 100 connects the low-pressure side hydraulic connection 6*a* or 6*b*, respectively, of the closed circuit with the tank 87. The volume of hydraulic fluid discharged at the discharge device 100 from the closed circuit is compensated by means of the charging device 110, which is formed by a charging pump 111 of the drive train which is driven by the drive motor 2. The charging pump 111 is operated in an open circuit, which sucks hydraulic fluid out of the tank 87 and delivers it into a delivery line 112. The delivery line 112 of the charging pump 111 is in communication by means of charging valves 113*a*, 113*b*, with the respective hydraulic connections 6*a*, 6*b*, so that the volume of hydraulic fluid discharged at the discharge device 100 is made up at the low-pressure side hydraulic connection 6*a* or 6*b* by the charging pump 111. To protect the charging pressure of the charging pump 111, a pressure relief valve 114 is associated with the delivery line 112. In the illustrated exemplary embodiment, the charging pump 111 also supplies a charging circuit 115 of the drive train with hydraulic fluid, which comprises one or more additional consumers.

The discharge device 100 comprises a discharge line 101 which is connected by means of a discharge valve 102 with the tank 87. In the illustrated exemplary embodiment, the discharge valve 102 is formed by a pressure relief valve.

The discharge line 101 is connected to the balancing line 54 of the shuttle valve device 51.

Instead of the connection of the delivery line 112 to the low-pressure side hydraulic connection 6*b* or 6*a*, respectively, the delivery line of the charging pump 111 can be connected to the balancing line 54.

The charging pump 111 can be a fixed displacement pump.

FIG. 10 illustrates a development of FIG. 9, according to which the charging pump 111 is a variable displacement pump 111*a*, the displacement volume of which is regulated as a function of the pressure in the low-pressure side hydraulic connections 6*b* and 6*a*, respectively, of the closed circuit.

The variable displacement pump 111*a* has a hydraulically regulated displacement volume. A displacement volume control device 111*b* of the variable displacement pump 111*a* can be actuated by means of a hydraulic control device 111*c*. A control pressure signaling line 116 leads to the control device 111*c* of the variable displacement pump 111*a*, and is connected with the low-pressure side hydraulic connection of the closed circuit.

The hydraulic control device 111*c* of the variable displacement pump 111*a* can have a positioning piston device which is in an operative connection with the displacement volume control device 111*b* of the variable displacement pump 111*a*. The positioning piston device has a control piston located in a longitudinally displaceable manner in a housing which is connected with the displacement volume control device 111*b* of the variable displacement pump 111*a*. The positioning piston of the positioning piston device is actuated by means of the spring device toward a maximum delivery volume and by means of the pressure carried in the control pressure signaling line 116 toward a minimum delivery volume. The control pressure signaling line 116 is connected to a control pressure chamber of the positioning piston device which acts in the direction of reducing the displacement volume.

The variable displacement pump 111*a* can also be provided with a stop for a minimum displacement volume, wherein the stop is designed so that the variable displacement pump delivers a minimum displacement for the supply of the consumers of the charging circuit 115 supplied with hydraulic fluid by the charging pump 111.

In FIG. 10, the discharge line 101 and the control pressure signaling line 116 are connected to the balancing line 54 of the shuttle valve device 51. The connection of the control pressure signaling line 116 to the balancing line 54 ensures that the displacement volume of the charging pump 111 is controlled by means of the shuttle valve device 51 as a function of the pressure in the respective low-pressure side hydraulic connection.

If, as in FIGS. 9, 10, to charge the high pressure accumulator 21 via the correspondingly actuated shuttle valve device 51, a determined quantity of hydraulic fluid is diverted from the high-pressure side hydraulic connection 6*a*, 6*b* of the closed circuit into the high pressure accumulator 21, the charging pump 111 makes up the corresponding amount of hydraulic fluid at the low-pressure side hydraulic connection 6*b*, 6*a* of the closed circuit. In FIG. 10, the control pressure signaling line 116 of the charging pump 111, in the form of a variable displacement pump 111*a*, is connected by means of the shuttle valve device 51 to the low-pressure side hydraulic connection 6*b* or 6*a* respectively, so that the delivery volume of the variable charging pump 111 is regulated as a function of the pressure prevailing in the low-pressure side hydraulic connection 6*b* or 6*a*. The charging pump 111 in FIG. 10, which is in the form of a variable displacement pump 111*a*, therefore delivers the necessary quantity of hydraulic fluid into the low-pressure side hydraulic connection 6*b* or 6*a*, respectively, to ensure the quantitative and volume balance in the closed circuit. It is thereby possible in a simple manner to absorb and buffer excess energy from the closed circuit by a charging operation of the high pressure accumulator 21, wherein the equivalent quantity of hydraulic fluid is delivered to the low-pressure side hydraulic connection 6*b* or 6*a*, respectively, of the closed circuit as needed by the charging pump 111 which is regulated by the pressure in the low-pressure side hydraulic connection 6*b* or 6*a* of the closed circuit.

Because of the as needed compensation of volume or quantity achieved by the charging pump 111 (which is in the form of a variable displacement pump 111*a*) during charging operation of the high pressure accumulator 20, in the other modes of operation during which no charging operation of the high pressure accumulator 20 takes place, the charging pump 111 does not deliver any excess delivery flow which would result in corresponding losses.

The stop for the minimum displacement volume of the charging pump 111 makes it possible for the charging pump 111 to always deliver a minimum flow to supply the other consumers of the charging circuit 115 with sufficient hydraulic fluid.

As shown in FIGS. 9 and 10, if during the discharge of the high pressure accumulator 21, hydraulic fluid from the high pressure accumulator 21 is delivered into the high-pressure hydraulic connection 6*a* or 6*b* of the closed circuit, by means of the shuttle valve device 51 the low-pressure side hydraulic connection 6*b* or 6*a*, respectively, is connected to the balancing line 54, so that via the discharge valve 102, during discharge operation of the high pressure accumulator 21, the quantity of hydraulic fluid equivalent to the quantity of fluid which is fed by the high pressure accumulator 21 into the high-pressure side hydraulic connection 6*a* or 6*b*, respectively, is diverted from the low-pressure side hydraulic connection 6*b* or 6*a*, respectively, to the tank 87 and discharged, to ensure the quantitative and volume balance in the closed circuit.

In FIGS. 9 and 10, an alternative embodiment of the shuttle valve device Si of the invention is also illustrated, in which the shuttle valve device 51 is formed by a plurality of individual valves and the valve function of the shuttle valve device 51 is performed by a plurality of individual valves in a distributed construction. The term "distributed construction" of the shuttle valve device 51 means an arrangement in which the high pressure accumulator path 51*a* and the hydraulic balancing path 51*b* are divided into different valves.

The shuttle valve device 51 illustrated in FIGS. 9 and 10 has a first shuttle valve 130 which is connected on the input side to the first connecting line 52*a* and to the second connecting line 52*b*, and is connected on the output side to the balancing line 54, and a second shuttle valve 131 which is also connected on the input side to the first connecting line 52*a* and to the second connecting line 52*b*, and is connected on the output side to the high pressure accumulator line 53. The first shuttle valve 130 controls the connection of the hydraulic connection 6*a* or 6*b* respectively with the balancing line 54 and, thus, with the discharge device 100, as well is optionally with the control pressure signaling line 116 of the control device 111*c* of the variable displacement pump 111*a*. The first shuttle valve 130 is provided with the hydraulic balancing path 51*b*. The second shuttle valve 131 correspondingly controls the connection of the hydraulic connection 6*a* or 6*b*, respectively, with the high pressure accumulator 21. The second shuttle valve 131 is provided with the high pressure accumulator path 51*a*.

The two shuttle valves 130, 131 are each in the form of three-port, two-position directional control valves.

The first directional control valve 130 is (as illustrated in greater detail in FIG. 11, which shows one constructive embodiment of the first shuttle valve 130) a spool valve which has a control member 141 located in a housing bore 140. The control member 141 is provided with a piston flange 142 and two outside control grooves 143, 144. In the illustrated position, the first shuttle valve 130 is in a closed position, in which the piston flange 142 shuts off the hydraulic connection to the balancing line 54. The control member 141 is actuated by means of two springs 145*a*, 145*b* into the closed position which is in the form of a center position. The springs 145$a$, 145$b$ are each located in control pressure chambers which are connected with the control pressure line 60$a$ or 60$b$, respectively. The control surfaces 61$a$, 61$b$ are located on the end surfaces of the control member 141.

Figure 11:
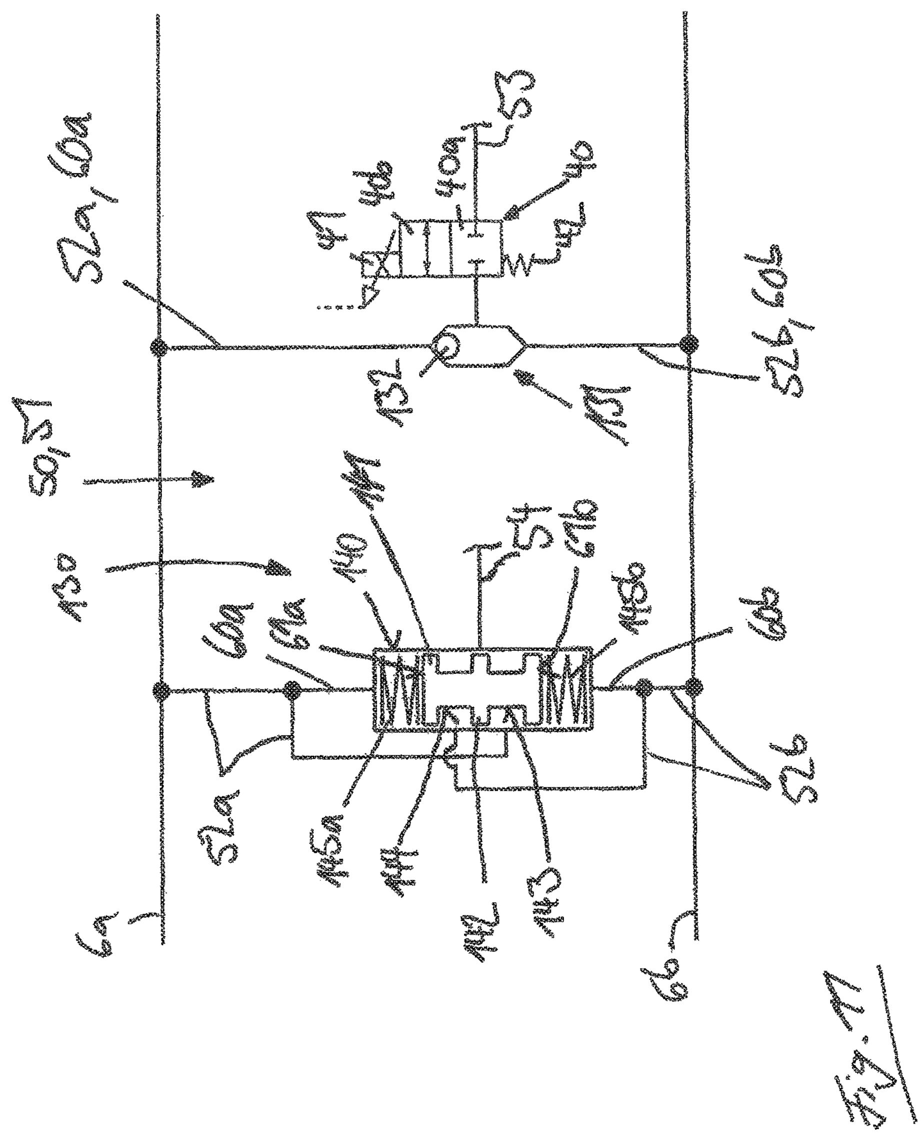
FIG. 11 is a constructive embodiment of a shuttle valve device of the invention.

If the hydraulic connector 6$a$ forms the high-pressure side of the closed circuit, by means of the control pressure line 60$a$, the control member 141 is actuated downward in FIG. 11 into the first control position. In the first control position, the balancing line 54 is in communication by means of the control groove 144 with the second connecting line 52$b$ and, thus, the low-pressure side second hydraulic connection 6$b$.

If the hydraulic connector 6$b$ forms the high-pressure side of the closed circuit, by means of the control pressure line 60$b$, the control member 141 is actuated upward in FIG. 11 into the second control position. In the second control position, the balancing line 54 is in communication via the control groove 143 with the first connecting line 52$a$ and, thus, the low-pressure side first hydraulic connection 6$a$.

Therefore, the first shuttle valve 130 in the first control position connects the second connecting line 52$b$ with the balancing line 54, and in the second control position connects the first connecting line 52$a$ with the balancing line 54.

As illustrated in greater detail in FIGS. 10 and 11, the second shuttle valve 131 is a check valve with a valve element 132. The check valve is connected at opposite inputs to lines, each of which has the function of the control pressure line 60$a$, 60$b$, and to the connecting line 52$a$, 52$b$. On the output side, the check valve is connected to the high pressure accumulator line 53.

If the hydraulic connection 6$a$ forms the high-pressure side of the closed circuit, by means of the control pressure line 60$a$, the valve element 132 of the check valve is actuated downward in FIG. 10 or 11, respectively, into the first control position, in which the high pressure accumulator line 53 is connected with the first connecting line 52$a$.

If the hydraulic connection 6$b$ forms the high-pressure side of the closed circuit, by means of the control pressure line 60$b$, the valve element 132 of the check valve is actuated upward into the position illustrated in FIG. 10 or 11, respectively, so that the high pressure accumulator line 53 is connected with the second connecting line 52$b$.

Therefore, the second shuttle valve 131 in the first control position connects the first connecting line 52 a with the high pressure accumulator line 53, and in the second control position connects the second connecting line 52$a$ with the high pressure accumulator line 53.

In FIGS. 10 and 11, the switching valve 40 with the closed position 40$a$ and the open position 40$b$ is also located in the high pressure accumulator line 53.

Figure 12:
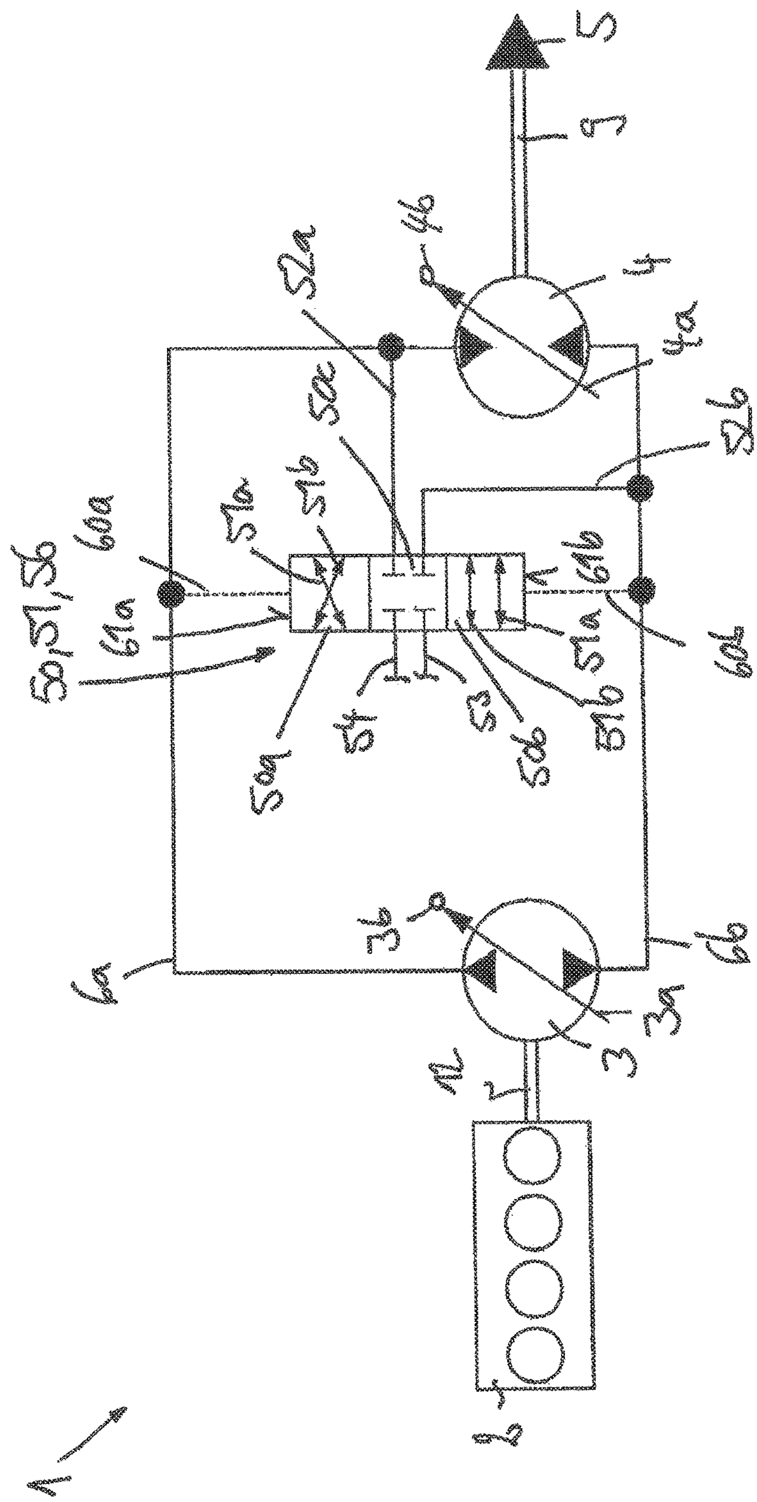
FIG. 12 is an alternative embodiment of the shuttle valve device of the invention.
Figure 13:
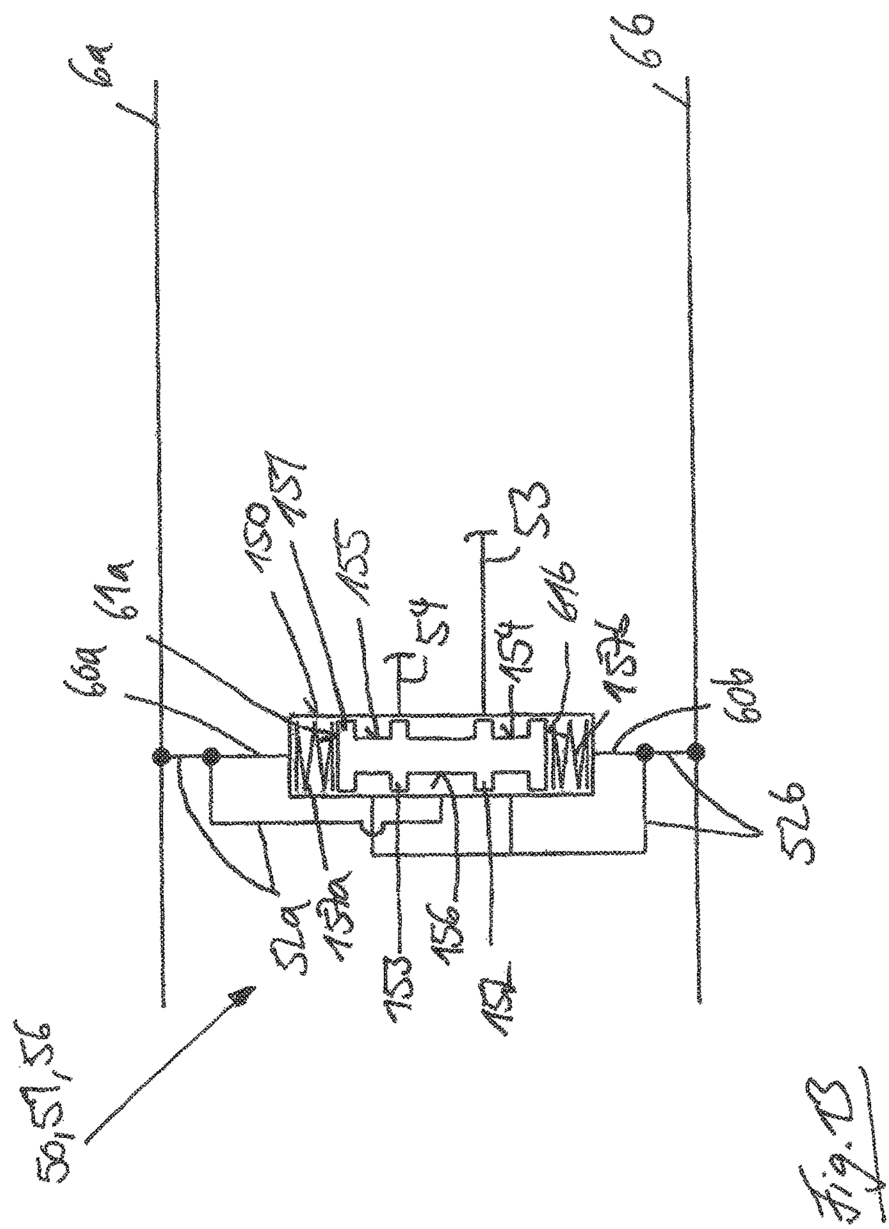
FIG. 13 is a constructive embodiment of the shuttle valve device illustrated in FIG. 12.

FIGS. 12 and 13 illustrate an additional embodiment of the hydraulically actuated shuttle valve device 51 of the invention. The shuttle valve device 51 in FIGS. 12 and 13 is a four-port, three-position control valve 56 which has the first control position 50$a$ and the second control position 50$b$ and also has the closed position 50$c$ as the center position.

FIG. 13 shows a constructive embodiment of the shuttle valve device 51 illustrated in FIG. 12. The shuttle valve device 51 is a spool valve, which comprises a control member 151 located in a housing bore 150. The control member 151 is provided with piston flanges 152, 153, two outside control grooves 154, 155, and a third control groove 156 which is located between the piston flanges 152, 153. In the illustrated position, the shuttle valve device 51 is in the closed position, in which the piston flanges 152, 153 shut off the hydraulic connections to the high pressure accumulator line 53 and the balancing line 54. The control member 151 is actuated into the closed position, which is the center position, by means of two springs 157$a$, 157$b$. The springs 157$a$, 157$b$ are each located in control pressure chambers which are connected with the control pressure lines 60$a$ or 60$b$ respectively. The control surfaces 61$a$, 61$b$ are located on the end surfaces of the control member 151.

If the hydraulic connection 6$a$ forms the high-pressure side of the closed circuit, by means of the control pressure line 60$a$, the control member 151 is actuated downward in FIG. 13 into the first control position. In the first control position, by means of the control groove 156, the first connecting line 52$a$ and, thus, the high-pressure side first hydraulic connection 6$a$ is connected with the high pressure accumulator line 53. Also in the first control position, by means of the control groove 155, the second connecting line 52$b$ thus the low-pressure side second hydraulic connection 6$b$ is connected with the balancing line 54.

If the hydraulic connection 6$b$ forms the high-pressure side of the closed circuit, by means of the control pressure line 60$b$, the control member 151 is actuated upward in FIG. 13 into the second control position. In the second control position, by means of the control groove 154, the second connecting line 52$b$ and thus the high-pressure side second hydraulic connection 6$b$ is connected with the high pressure accumulator line 53. Also in the second control position, by means of the control groove 156, the first connecting line 52$a$ and, thus, the low-pressure side first hydraulic connection 6$a$ is connected with the balancing line 54.

It is also contemplated that a proportional valve may be used in place of the shuttle valve device 51 illustrated in FIGS. 1 to 13.

The hydraulically actuated shuttle valve device 51 of the invention and illustrated in FIGS. 1 to 13 ensures that, regardless of the direction of movement of the consumer and regardless of the mode of operation (drive phase, braking phase), the high pressure accumulator device 20 is always connected with the high-pressure side hydraulic connection 6$a$ or 6$b$, respectively, of the closed circuit. Furthermore, the hydraulically actuated shuttle valve device 51 illustrated in FIGS. 1 to 13 ensures that, regardless of the direction of movement of the consumer and regardless of the mode of operation (drive phase, braking phase), the respective other low-pressure side hydraulic connection 6$a$ or 6$b$, respectively, of the closed circuit is connected with the hydraulic balancing device 30.

The hydraulically actuated shuttle valve device 51 of the invention does not require any electrical actuators for actuation, so that the hydraulically actuated shuttle valve device 51 of the invention has a simple, compact, and economical construction and is not subject to interference in operation. The hybrid function achieved in connection with the high pressure accumulator device 20 and the hydraulic balancing device 30 can therefore be implemented in a simple, compact, and economical construction.

If the capability to absorb excess energy from the closed circuit in the high pressure accumulator device 20 exists in the hydrostatic drive 1, the high pressure accumulator device 20 is charged with a quantity of hydraulic fluid from the high-pressure side hydraulic connection 6$a$ or 6$b$, respectively. In charging operation of the high pressure accumulator device 20, the hydraulic balancing device 30 ensures that in the low-pressure side hydraulic connection 6$b$ or 6$a$, respectively, the quantity of hydraulic fluid that is added to the high-pressure side hydraulic connection 6$a$ or 6$b$, respectively, of the high pressure accumulator device 20 is made up by an equivalent amount of hydraulic fluid to ensure the maintenance of a quantitative and volume balance in the closed circuit.

The quantity of hydraulic fluid accumulated in the high pressure accumulator device 20 can then again be fed into the high-pressure side hydraulic connection 6*a* or 6*b*, respectively, of the closed circuit. By means of the shuttle valve device 51, the low-pressure side hydraulic connection 6*b* or 6*a*, respectively, is connected to the balancing line 54, so that via the hydraulic balancing device 30, a quantity of hydraulic fluid that is equivalent to the quantity of hydraulic fluid that is fed from the high pressure accumulator device 20 into the high-pressure side hydraulic connection 6*a* or 6*b* is diverted from the low-pressure side hydraulic connection 6*b* or 6*a*, respectively, to guarantee the quantitative and volume balance in the closed circuit.

The charging of the high pressure accumulator device 20 with hydraulic fluid from the high-pressure side hydraulic connection 6*a* or 6*b* can primarily be done with energy from the drive motor 2. The pump 3 that delivers into the high-pressure side hydraulic connection 6*a* or 6*b*, respectively, and is driven by the drive motor 2 therefore delivers hydraulic fluid via the high pressure accumulator line 53 into the high pressure accumulator device 20.

Alternatively, the high pressure accumulator device 20 can be charged during braking operation of the consumer 5 with hydraulic fluid from the high-pressure side hydraulic connection 6*a* or 6*b*, respectively, as a result of which it becomes possible to recover energy.

When the high pressure accumulator device 20 is charged, the energy accumulated in the high pressure accumulator device 20 can be used to drive the motor 4, wherein via the high pressure accumulator line 53, hydraulic fluid is fed to the high-pressure side hydraulic connection 6*a* or 6*b* from the high pressure accumulator device 20.

The charging or discharging of the high pressure accumulator device 20 can be influenced by means of the electronic control device 15 and a corresponding setting of the displacement volume control device 3*a* of the pump 3 and optionally of the displacement volume control device 4*a* of the motor 4. Corresponding operating strategies are stored in the electronic control device 15 for the charging or discharging of the high pressure accumulator device 20, depending on the operating conditions of the drive. The signals from the signal generators 14*a*, 14*b* and from the pressure sensor 85 can be evaluated by the electronic control device 15 and the displacement volume control device 3*a* of the pump 3 and optionally the displacement volume control device 4*a* of the motor 4 can be optimally set as a function of the operating status of the drive system 1.

Operational strategies can be stored in the electronic control device 15 that actuates the displacement volume control device 3*a* of the pump 3 (variable displacement pump) and/or operates the displacement volume control device 4*a* of the variable displacement motor 4, to charge the high pressure accumulator device 20 as a function of the operating status of the drive system 1 with energy from the drive motor 2 and/or during braking operation of the consumer 5 with hydraulic fluid. The charging of the high pressure accumulator device 20 with braking energy during a braking phase of the consumer 5 therefore makes possible a recovery of energy during braking operation of the consumer 5.

Also stored in the electronic control device 15 are operating strategies to use the hydraulic fluid from the charged high pressure accumulator device 20, as a function of the operating status of the drive system 1, to drive the hydrostatic motor 4 and/or to drive the hydrostatic pump 3.

During charging and discharging of the high pressure accumulator device 20, the electronic control device 15 controls the displacement volume control devices 3*a* and 4*a*, respectively, and regulates the speed of rotation of the drive motor 2 as a function of the input variables of the signal transmitters 14*a*, 14*b* and of the pressure sensor 85 and the pressure sensors 88, 89.

The energy stored in the high pressure accumulator device 20 can be used to drive the motor 4. The high pressure accumulator device 20 therefore makes possible a booster drive of the running drive motor 2. Alternatively, the energy stored in the high pressure accumulator device 20 can be used to drive the pump 3. The high pressure accumulator device 20 therefore makes possible, in combination with the pump 3, the function of a hydraulic starter of the shutoff drive motor 2 in the framework of a start-stop function of the drive motor 2. For the function of the pump 3 as a hydraulic starter which is driven by the hydraulic fluid from the high pressure accumulator device 20, the motor 4 (which is in the form of a variable displacement motor) is set to the displacement volume of zero.

The hybrid function of the invention formed by the high pressure accumulator device 20 can therefore be used to assist the running drive motor 2 and/or as a hydraulic starter in the framework of a start-stop function of the drive motor 2, whereby on account of the robust construction and function of the pump 3, a start-stop function of the drive motor 2 can be achieved economically. When the drive motor 2 is in the form of an internal combustion engine, with the hybrid function formed by the high pressure accumulator device 20, a reduction of fuel consumption as well as a reduction of emissions can be achieved during operation of the drive system 1.

The hybrid function of the invention occupies a small amount of space, has a robust construction and function, and is economical to operate. With the pressure-controlled and pressure-actuated shuttle valve device 51 of the invention, in combination with the high pressure accumulator device 20 and the hydraulic balancing device 30, a hydrostatic drive system 1 can be provided with little added construction or expense in the closed circuit with a hybrid function which makes it possible to extract energy from the closed circuit and add energy to the closed circuit.

The invention is not limited to the illustrated exemplary embodiments.

The consumer 5, as an alternative to a traction drive, can be a slewing gear of a vehicle, such as a work machine in the form of an excavator.

The pump 3 and the motor 4 of the hydrostatic drive system 1 can be in the form of an axial piston machine utilizing a swashplate construction or a bent axis axial piston pump or motor. Alternatively, the pump 3 and/or the motor 4 can be in the form of a radial piston machine or a gear machine.

The drive motor 2, as an alternative to an internal combustion engine, can be an electric motor or a turbine.

The pressure sensor 85 illustrated in FIGS. 1, 2, 7, 8 and/or the pressure protection valve 86 illustrated in FIGS. 7 and 8 can also be provided on the other exemplary embodiments. Likewise, the pressure sensors 88, 89 illustrated in FIGS. 1 and 2 can also be provided on all of the other exemplary embodiments.

It goes without saying that the different embodiments of the high pressure accumulator device 20 and of the hydraulic balancing device 30 and the different embodiments of the hydraulically actuated shuttle valve device 51 of the invention can be combined with each other in any desired manner.

It will be readily appreciated by those skilled in the art that modifications may be made to the invention without departing from the concepts disclosed in the forgoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic drive comprising:

a hydrostatic pump driven by a drive motor and connected in a closed circuit with a hydrostatic motor, wherein the closed circuit is formed by a first hydraulic connection and a second hydraulic connection, and wherein each of the first and second hydraulic connections can form a high-pressure side or a low-pressure side of the closed circuit;

a high pressure accumulator device connectable with the high-pressure side hydraulic connection for the accumulation of energy and for the discharge of energy wherein simultaneously the low-pressure side hydraulic connection is connectable with a hydraulic balancing device; and a single hydraulically controlled switching valve for control of the simultaneous connection of the high pressure accumulator device with the high-pressure side hydraulic connection and the hydraulic balancing device with the low-pressure side hydraulic connection, wherein the hydraulically controlled switching valve is connected on an input side to the first and second hydraulic connections, wherein the hydraulically controlled switching valve is connected on an output side to the high pressure accumulator device and the hydraulic balancing device, and wherein the hydraulically controlled switching valve includes a high pressure accumulator path extending between the high pressure accumulator device and one of the first and second hydraulic connections, and a hydraulic balancing path extending between the hydraulic balancing device and the other of the first and second hydraulic connections, and is in communication for actuation with the first and second hydraulic connections of the closed circuit.

2. The hydrostatic drive as recited in claim 1, wherein the hydraulically controlled switching valve is in communication by means of a first connecting line with the first hydraulic connection of the closed circuit, by means of a second connecting line with the second hydraulic connection of the closed circuit, by means of a high pressure accumulator line with the high pressure accumulator device, and by means of a balancing line with the hydraulic balancing device.

3. The hydrostatic drive as recited in claim 2, wherein the hydraulically controlled switching valve in a first control position connects the first connecting line with the high pressure accumulator line and the second connecting line with the balancing line, and in a second control position connects the first connecting line with the balancing line and the second connecting line with the high pressure accumulator line.

4. The hydrostatic drive as recited in claim 1, wherein a first control pressure line leads from the first hydraulic connection of the closed circuit to a control surface of the hydraulically controlled switching valve that acts in the direction of the first control position, and a second control pressure line leads from the second hydraulic connection of the closed circuit to a control surface of the hydraulically controlled switching valve that acts in the direction of the second control position.

5. The hydrostatic drive as recited in claim 1, wherein the hydraulically controlled switching valve has a closed position in which the high pressure accumulator path and/or the hydraulic balancing path is shut off.

6. The hydrostatic drive as recited in claim 1, wherein the hydraulically controlled switching valve is a four-port, two-position control valve that has a first control position and a second control position.

7. The hydrostatic drive as recited in claim 1, wherein the hydraulically controlled switching valve is a four-port, three-position control valve, which has a first control position and a second control position and is provided with a closed position as the center position.

8. The hydrostatic drive as recited in claim 1, wherein the hydrostatic pump comprises a variable displacement pump with a variable displacement volume and the hydrostatic motor comprises either a fixed displacement motor with a fixed displacement volume or a variable displacement motor with a variable displacement volume.

9. The hydrostatic drive as recited in claim 8, including an electronic control device to vary the displacement volume of the variable displacement pump and/or of the variable displacement motor, wherein the electronic control device includes stored operating strategies to charge the high pressure accumulator device with hydraulic fluid as a function of the operating conditions of the drive system with energy from the drive motor and/or during braking operation of the consumer with braking energy from the consumer.

10. The hydrostatic drive as recited in claim 9, including operating strategies stored in the electronic control device, wherein the operating strategies are configured to utilize the hydraulic fluid from the charged high pressure accumulator device as a function of operating conditions of the hydrostatic drive to drive the hydrostatic motor and/or to drive the hydrostatic pump.

11. The hydrostatic drive as recited in claim 10, wherein the variable displacement motor can be set to the displacement volume of zero and the variable displacement motor, while driving the hydrostatic pump with the hydraulic fluid from the charged high pressure accumulator device, is set to the displacement volume of zero.

12. The hydrostatic drive as recited in claim 9, wherein the electronic control device is in communication with a pressure sensor that measures the accumulator charge pressure of the high pressure accumulator device and/or with pressure sensors that measure the pressure in the hydraulic connections.

13. The hydrostatic drive as recited in claim 1, wherein the hydraulic balancing device comprises a low pressure accumulator.

14. The hydrostatic drive as recited in claim 1, including a double piston accumulator which forms the high pressure accumulator device and the hydraulic balancing device.

15. The hydrostatic drive as recited in claim 1, wherein the hydraulic balancing device comprises a hydrostatic dual-flow double drive unit positioned between one of the two hydraulic connections and the high pressure accumulator.

16. The hydrostatic drive as recited in claim 1, wherein the consumer comprises a slewing gear of a vehicle.

17. The hydrostatic drive as recited in claim 1, wherein the consumer comprises a traction drive of a vehicle.

18. The hydrostatic drive as recited in claim 1, wherein the hydrostatic drive comprises a continuously variable hydrostatic branch of a power split transmission.

19. A vehicle, comprising:

a consumer; and a hydrostatic drive in a drive connection with the consumer, the hydrostatic drive comprising:

a hydrostatic pump driven by a drive motor and connected in a closed circuit with a hydrostatic motor, wherein the hydrostatic motor is in a drive connection with a consumer, wherein the closed circuit is formed by a first hydraulic connection and a second hydraulic connection, and wherein each of the first and second hydraulic connections can form a high-pressure side or a low-pressure side of the closed circuit;

a high pressure accumulator device connectable with the high-pressure side hydraulic connection for the accumulation of energy and for the discharge of energy wherein simultaneously the low-pressure side hydraulic connection is connectable with a hydraulic balancing device; and a single hydraulically controlled switching valve for control of the simultaneous connection of the high pressure accumulator device with the high-pressure side hydraulic connection and the hydraulic balancing device with the low-pressure side hydraulic connection, wherein the hydraulically controlled switching valve is connected at an input side to the first and second hydraulic connections, wherein the hydraulically controlled switching valve is connected at an output side to the high pressure accumulator device and the hydraulic balancing device, and wherein the hydraulically controlled switching valve includes a high pressure accumulator path extending between the high pressure accumulator device and one of the first and second hydraulic connections, and a hydraulic balancing path extending between the hydraulic balancing device and the other of the first and second hydraulic connections, and is in communication for actuation with the first and second hydraulic connections of the closed circuit.

* * * * *